United States Patent [19]

Tanaka et al.

[11] Patent Number: 5,683,183
[45] Date of Patent: Nov. 4, 1997

[54] SPINDLE DEVICE AND BEARING DEVICE THEREFOR

[75] Inventors: Katsuhiko Tanaka; Hiromitsu Muraki; Ikunori Sakatani, all of Kanagawa, Japan

[73] Assignee: NSK Ltd., Tokyo, Japan

[21] Appl. No.: 721,345

[22] Filed: Sep. 26, 1996

[30] Foreign Application Priority Data

| Sep. 26, 1995 | [JP] | Japan | 7-247944 |
| Dec. 6, 1995 | [JP] | Japan | 7-318331 |
| Dec. 6, 1995 | [JP] | Japan | 7-318333 |
| Aug. 9, 1996 | [JP] | Japan | 8-211495 |

[51] Int. Cl.⁶ .................................. F16C 32/06
[52] U.S. Cl. ............. 384/100; 384/101; 384/114; 384/625
[58] Field of Search .................. 384/100, 101, 384/107, 114, 125, 126, 625

[56] References Cited

U.S. PATENT DOCUMENTS

| 5,028,148 | 7/1991 | Kanamaru et al. | 384/100 X |
| 5,366,298 | 11/1994 | Toshimitsu et al. | 384/100 X |
| 5,536,088 | 7/1996 | Cheever et al. | 384/107 |
| 5,541,462 | 7/1996 | Nii et al. | 384/114 X |

*Primary Examiner*—Thomas R. Hannon
*Attorney, Agent, or Firm*—Sughrue, Mion, Zinn, Macpeak & Seas, PLLC

[57] ABSTRACT

A bearing device includes a housing, a shaft arranged in an inner circumference of the housing, and a pair of bearings arranged between the shaft and the housing, and spaced from each other in an axial direction of the shaft, at least one of the bearings comprising a sleeve inserted in the housing and formed cylindrically. The sleeve has an outer layer portion including an outer cylindrical surface and an inner layer portion including an inner cylindrical surface, the outer layer portion being harder than the inner layer portion, the inner cylindrical surface having a groove for generating dynamic pressure. The sleeve is improved in working accuracy, and the dynamic pressure generating grooves can be formed with ease.

4 Claims, 10 Drawing Sheets

SPINDLE DEVICE AND BEARING DEVICE THEREFOR

BACKGROUND OF THE INVENTION

The present invention relates to a bearing device which is suitable for a spindle motor in a video/data apparatus such as a magnetic disk device, an optical disk device, a laser printer, and a VTR (video tape recorder).

In the spindle motor of a conventional magnetic disk device, its shaft is rotatably supported by two ball bearings which are spaced from each other along the shaft, so that it is rotatable with respect to the housing.

Recently, magnetic disks have been decreased in thickness and increased in data record density. Accordingly, there has been a strong demand for the provision of a spindle motor which has the small amount of run-out of a non-rotation synchronizing component which is not synchronous with the speed of rotation (it is the run-out in radial direction of the shaft which is not synchronous with the speed of rotation of the shaft with respect to the revolving circle which the central axis of the shaft forms around the central axis of the housing when the shaft is rotated).

In the above-described bearing device having two ball bearings, it is difficult to reduce the run-out of the non-rotation synchronizing component because it is affected by the difference in diameter between a plurality of ball bearings, and the sphericity of the balls. As shown in FIG. 16A or 16B, a bearing device of a first conventional example has been proposed in which a shaft 3 is supported by two radial dynamic pressure bearings 15, and the lower end face or the upper end face of the shaft 3 is supported by a thrust dynamic pressure bearing 16 (in FIGS. 16A and 16B, a thrust plate 17 supports the end face of the shaft 3). FIG. 16A shows a spindle motor of the type that the shaft is rotated, and FIG. 16B shows a spindle motor of the type that a housing 4a is turned.

As shown in FIG. 16B, this spindle motor is arranged as follows. The shaft 3 is fixed to the base 4b in which the axis Of the shaft 3 is directed in the upward and downward direction. The shaft 3 is inserted into an insertion hole 2a formed in the hub 2 which is also used as a bearing member. Therefore, the hub 2 is capable of rotating.

That is, two radial bearings 15, which function as dynamic pressure bearings, are formed by the outer circumferential surface of the shaft 3 (stationary member) and the insertion hole 2a of the hub 2. At the same time, a thrust bearing is formed by the lower surface of a thrust plate 17 fixed onto an upper end opening side of the insertion hole 2a and the upper end surface of the shaft 3. Accordingly, the hub 2 is rotatably supported by the shaft 3 via the radial bearings 15 and the thrust bearing 16. The hub 2 is driven at high speed by the rotor 7a fixed to the hub 2 and the stator 7b fixed to the base 4b. In this connection, reference numerals 32 and 33 denote air-bleeding holes.

in each radial bearing 15, the radial bearing surface 18 formed on an outer circumferential surface of the shaft 3 is opposed to the radial bearing surface 19 formed in the insertion hole 2a of the hub 2 through a predetermined bearing clearance. In this construction, tapered portions 19b, 19c are formed in the insertion hole 2a at both end portions in the axial direction of the radial bearing surface 19. Each tapered portion 19b, 19c includes a tapered surface which is separate from the outer circumferential surface of the shaft 3 as the inside diameter of the tapered surface expands outwardly in the axial direction. That is, the radial bearing surface 19 formed in the insertion hole 2a includes two tapered portions 19b, 19c formed at both end portions and a cylindrical bearing surface body located between the two tapered portions 19b, 19c.

Lubricating fluid is charged in a bearing clearance between the radial bearing surface 19 formed in the insertion hole 2a and the radial bearing surface 18 of the shaft 3. In this arrangement, the tapered portions 19b, 19c hold a necessary amount of lubricating fluid for the bearing.

A herringbone-shaped groove 5c for generating a dynamic pressure is formed on the bearing surface body in the bearing surface 19 formed in the insertion hole 2a. By the action of this groove 5c, when the hub 2 is rotated to act as a rotary member, the lubricating fluid provided on each tapered portion side 19b, 19c is fed toward the center in the axial direction of the bearing surface body. Therefore, a necessary amount of lubricating fluid is fed into a bearing clearance between the bearing surface body and the bearing surface 18 of the shaft 3 which is opposed to the bearing surface body.

On the other hand, there is a demand in the art for the provision of a spindle motor which is low in power consumption and large in axial load capacity. In order to meet this requirement, it is necessary that the lubricating fluid for the thrust bearing section is higher in viscosity than for the radial bearing section. However, in this case, the two kinds lubricating fluids may mix with each other during operation.

In this connection, the present inventors have proposed a bearing device in which, on the side of the hub as viewed in the axial direction of the shaft, the radial contact surface of the shaft is supported with a radial dynamic pressure bearing, and, on the opposite side, it is supported by a ball bearing whose inner raceway is formed on the shaft (cf. Unexamined Japanese Patent Publication No. 306714/1993). In the bearing device, the shaft tends to revolve with its part as a fulcrum which is supported by the ball bearing high in rigidity, in such a manner that it draws a conical locus whose bottom is on the side of the radial dynamic pressure bearing which is low in rigidity. That is, the part of the shaft which is larger in run-out is turned in a non-contact mode being supported by the fluid film of the radial dynamic pressure bearing. Hence, the bearing device is reduced in the run-out of the non-rotation synchronizing component to the same extent that the bearing device shown in FIG. 16A or 16B.

However, the bearing device disclosed under Unexamined Japanese Patent Publication No. 306714/1993 is still disadvantageous in that the sleeve is liable to be low in dimensional accuracy, and the formation of the dynamic pressure generating grooves is low in working efficiency.

That is, the dynamic pressure generating grooves may be formed by etching, shot blasting, or shot peening, or plastic working such as ball rolling. However, in the case where the sleeve is made of a hard material in its entirety, the grooves must be formed by etching or shot blasting, which results in an increase in manufacturing cost.

On the other hand, in the case where the sleeve is made of a soft material in its entirety, the grooves may be formed with high work efficiency; that is, the sleeve may be subjected to plastic working such as ball rolling, which results in a reduction in manufacturing cost. However, this method involves the following difficulties: That is, in removing the swell of the inner cylindrical surface of the sleeve, and in correcting the concentricity of the inside and outside diameters of the sleeve (which are carried out in the finishing step after the ball rolling step), the outer cylindrical surface of the sleeve corresponding to the outside diameter surface may be damaged and therefore it is impossible to work the inner cylindrical surface with the outside diameter as a reference. Accordingly, it is impossible to make the inside and outside diameters high in concentricity.

Further, in the radial bearing 15 which is a dynamic pressure bearing described above, the lubricating fluid existing in the tapered portions 19b, 19c is fed to the bearing surface body in accordance with the rotation of the hub 2. However, by the wettability of the bearing surface 19 with respect to the lubricating fluid, a part of the lubricating fluid existing on the bearing surface body leaks to the tapered portions 19b, 19c. The lubricating fluid which has leaked to the tapered portions 19b, 19c is moved outside in the axial direction along the tapered portions 19b, 19c by the action of a centrifugal force generated by the rotation of the hub 2. Accordingly, there is a possibility that the lubricating fluid leaks and splashes outside the bearing.

When the lubricating fluid leaks and splashes as described above, a necessary amount of lubricating fluid for the lubrication of the dynamic pressure bearing is reduced, so that the durability of the bearing is deteriorated, and further the inside of the apparatus in which the bearing is installed is stained with lubricating fluid that has splashed. Such a dynamic pressure bearing is not suitable for precision mechanical equipment such as a magnetic disk device or VTR.

For the prevention of leakage of lubricating fluid from the insertion hole 2a in the case of stoppage of the hub 2, an oil repellent agent is conventionally coated on the lower end surface 1a of the hub 2 communicating with the lower tapered portion 19c of the lower radial bearing 15. This oil repellent agent is coated to prevent the lubricating fluid in the tapered portion 19c from moving onto the lower end surface 1a. Accordingly,, it is not possible to directly prevent the lubricating agent from splashing outside the bearing from the tapered portion 19c while the hub 2 is rotating. Further, it is not possible either to prevent the lubricating agent from splashing and leaking to the central side in the axial direction of the insertion hole 2a, that is, it is not possible either to prevent the lubricating agent from splashing and leaking into a space formed between the upper and the lower radial bearing 15.

A second conventional example of a spindle device employed in the conventional magnetic disk unit is as shown in FIG. 17.

In the conventional spindle device, a disk 150 is mounted on a hub 151 which is rotatably supported by a shaft 154 through two deep groove ball bearings 152 and 153. An electric motor 156 is provided below the ball bearings 152 and 153 in which the electric motor 156 is interposed between the hub 151 and a housing 155 supporting the shaft 154. That is, the hub 151 and the disk 150 are rotated by the motor 156.

However, the ball bearings 152 and 153 suffers from ball passage vibration and inherent vibration which is due to the elasticity of the bearing components. Even though the machining accuracy is improved highly, it is difficult to make the run-out of the non-rotation synchronizing component lower than a certain value. On the other hand, the inventors have conducted research on the spindle device, and found that the non-rotation synchronizing component of the spindle device is more dependent on the misalignment of the two ball bearings 152 and 153 (supporting the rotor) which is due to the assembling error than on the run-out of each of the ball bearings 152 and 153 which is due to the non-rotation synchronizing component.

On the other hand, a spindle device has been studied in which dynamic pressure bearings having the small run-out of the non-rotation synchronizing component are employed as a radial bearing and a thrust bearing instead of the two ball bearings 152 and 153. In the dynamic pressure bearing, the bearing surfaces are in contact with each other when it is at rest. Hence, the dynamic pressure bearing is disadvantageous in that the start torque is great. Especially when the spindle device is held vertically during use, the start torque is great, and the thrust bearing surfaces are liable to be damaged or worn when it is repeatedly started and stopped.

SUMMARY OF THE INVENTION

In view of the above-described difficulties accompanying a conventional bearing device, a first object of the invention is to provide a bearing device which is improved in the accuracy in working of the sleeve for the dynamic pressure bearing and in the easiness in the formation of the dynamic pressure generating groove.

A second object of the present invention is to provide a dynamic pressure bearing capable of preventing the lubricating fluid from splashing outside the bearing unit in the rotation or stoppage of the rotating member so as to enhance the durability of the bearing and also capable of preventing the inside of the apparatus, in which the bearing is installed, from being stained with splashing lubricating fluid.

A third object of this invention is to provide a spindle device which is compact, and small in the amount of run-out in the radial direction of disk mounted thereon which is due to the run-out of the non-rotation synchronizing component, and which is small in start torque, and shows high durability even if it is repeatedly started and stopped.

The first object of the invention has been achieved by the provision of a bearing device in which a shaft is arranged in a cylindrical housing in such a manner that the shaft is coaxial with the housing, between the shaft and the housing, two bearings are arranged in such a manner that the bearings are spaced from each other in the axial direction, at least one of the two bearings is a dynamic pressure bearing sleeve which is in the form of a cylinder and inserted in the housing, and in the sleeve, an outer layer portion includes the outer cylindrical surface and the vicinity is harder than an inner layer portion which includes the inner cylindrical surface and the vicinity, the inner cylindrical surface having dynamic pressure generating grooves.

In the bearing device, the sleeve is designed as follows: The outer cylindrical surface of the cylinder, and at least one end face are subjected to heat treatment or plating, to harden the outer layer portion. Thereafter, the dynamic pressure generating grooves are formed in the inner cylindrical surface of the sleeve which is not hardened.

Alternatively, the sleeve may be obtained as follows: An outer cylinder of a hard metal such as iron alloy is prepared, and an inner cylinder of a relatively soft metal such as copper alloy is fitted in the outer cylinder. Thereafter, the dynamic pressure generating grooves are formed in the inner cylindrical surface of the inner cylinder. In this case, the outer cylinder corresponds to the outer layer portion, and the inner cylinder corresponds to the inner later portion.

Preferably, the sleeve is a cylinder which is made of an iron-based metal such as SUJ2 and SUS440C, and the outer cylindrical surface of the cylinder and at least one end face is subjected to heat treatment so that the outer layer portion is harder than the inner layer portion.

In the sleeve according to the invention, its inner layer portion is relatively soft and the dynamic pressure generating grooves can be readily formed in the inner cylindrical surface of the sleeve. In the case where the sleeve is made of a hard material in its entirety, the grooves must be formed, for instance, by etching or shot blasting, which results in an increase in manufacturing cost. In the case of the sleeve whose inner cylindrical surface is relatively soft, the dynamic pressure generating grooves can be readily formed, for instance, by ball rolling, which decreases the manufacturing cost as much.

On the other hand, in the case where the sleeve is made up of a relatively soft material in its entirety, the dynamic pressure generating grooves may be formed with high efficiency; however, in removing the swell of the inner cylindrical surface which is caused by the ball rolling operation, or in correcting the concentricity of the inside and outside diameters of the sleeve, the outer cylindrical surface may be damaged. Hence, it is impossible to machine the inner cylindrical surface of the sleeve with the outside diameter of the sleeve as a reference, and accordingly it is also impossible to improve the concentricity of the inside and outside diameters of the sleeve. On the other hand, in the sleeve of the invention, the outer cylindrical surface is harder than the inner layer portion, and therefore the inner cylindrical surface can be ground with the outside diameter of the sleeve as a reference. That is, the dynamic pressure generating grooves can be readily formed, and the inside and outside diameters of the sleeve are high in concentricity.

The above-described bearing device of the invention may be modified as follows: One of the two bearings is a dynamic pressure bearing sleeve while the other is a ball bearing, and the dynamic pressure bearing sleeve side is greater in rotational inertial force than the ball bearing side.

The second object of the invention has been achieved by the provision of a dynamic pressure bearing including: a bearing surface provided on the stationary member; a bearing surface provided on the rotary member, opposed to the bearing surface provided on the stationary member via a bearing clearance; a dynamic pressure generating groove, provided on at least one of the bearing surfaces; and a lubricating fluid filled in the beating clearance, in which at least one of the bearing surfaces on the stationary member and the rotary member is coated with a lubricating fluid repellent agent.

In the present invention, when the bearing surface of the rotary member is coated with a lubricating fluid repellent agent, the wettability of the bearing surface of the rotary member with respect to the lubricating fluid is lowered. Lubricating fluid exists in the end portion in the axial direction of the bearing surface when the rotary member is rotated, and also exists in the outer circumferential portion of the bearing surface. When this lubricating fluid is fed with pressure to the center in the axial direction of the bearing surface or the center in the radial direction by the action of the dynamic pressure generating groove, leakage of the lubricating fluid from the bearing surface to the outside of the bearing can be suppressed.

As a result, it is possible to reduce the splash of lubricating fluid to the outside of the bearing which is caused by a centrifugal force in the rotation of the rotary member while the cause of splash is the wettability of the bearing surface of the rotary member.

When the bearing surface of the stationary member is coated with a lubricating fluid repellent agent, at the time of non-rotation of the rotary member, the lubricating fluid is pushed by the action of a capillary action into a bearing clearance between the bearing surface of the rotary member and the bearing surface of the stationary member. Accordingly, after the lubricating oil has been repelled by the lubricating fluid repellent agent, it moves toward the center of the bearing clearance. Therefore, leakage of lubricating fluid from the bearing clearance can be prevented.

In the case of a radial bearing, an end portion in the axial direction of the bearing surface is preferably coated with a lubricating fluid repellent agent, and in the case of a thrust bearing, an outer circumferential portion of the bearing surface is preferably coated with a lubricating fluid repellent agent.

However, when only a portion of the bearing surface is coated with the lubricating fluid repellent agent as described above, the coated region is restricted to a small area. Therefore, it is difficult to automate the coating operation. As a result, there is a possibility that the manufacturing cost is raised and the quality of bearings fluctuates.

For this reason, it is preferable that all bearing surfaces are coated with the lubricating fluid repellent agent.

The third object of the invention has been achieved by the provision of a spindle device in which a rotating element on which a disk is mounted is rotatably supported by a stationary member with the aid of a dynamic pressure bearing and a ball bearing, the rotating element being rotated by an electric motor including a rotor fixedly secured to the rotating element, and a stator fixedly secured to the stationary member in such a manner as to confront with the rotor, in which, according to the invention, the center of gravity of the disk is positioned between both ends of the dynamic pressure bearing as viewed in the axial direction, and the radial component of a force of magnetic attraction between the rotor end the stator is applied more to the ball bearing than to the dynamic pressure bearing.

In the spindle device of the invention, the rotating element is supported by the ball bearing and the dynamic pressure bearing, so that all the axial load of the rotating element is supported by the ball bearing which is small in friction at the time of start. Hence, even when the spindle device is stood vertically during use, the start torque is small. In addition, the bearing surface of the dynamic pressure bearing is scarcely damaged or worn, and the spindle device shows high durability even if it is frequently started and stopped.

Further, in the spindle device of the invention, the rotating element is supported by the ball bearing and the dynamic pressure bearing. Hence, the spindle device of the invention, unlike the conventional one in-which the rotating element is supported by two ball bearings, is free from the non-rotation synchronizing component which attributes to the misalignment of the ball bearings which is due to the assembling error.

Moreover, in the spindle device of the invention, the center of gravity of the disk is positioned between both ends of the dynamic pressure bearing which is extremely small or zero in non-rotation synchronizing component, as viewed in the axial direction. Hence, the radial run-out of the disk is substantially equal to the run-out of the dynamic pressure bearing, and the radial run-out of the disk which is due to the non-rotation synchronizing component is substantially zero.

The radial component of the force of attraction which is produced by the various forces of magnetic attraction between the rotor and the stator at the start of the motor and during the rotation of the motor, is applied to the ball bearing large in load capacity more than to the dynamic pressure bearing; that is, the radial load applied to the dynamic bearing is decreased, and accordingly the dynamic pressure bearing may be designed small in load capacity. In short, the bearing torque is smaller than in the case where the rotating element is supported by the dynamic pressure bearing.

BRIEF DESCRIPTION OF THE DRAWINGS

FIG. 12A is a view showing a state in which the dynamic pressure bearing is not rotated, and FIG. 12B is a view showing a state in which the dynamic pressure bearing is rotated;

DETAILED DESCRIPTION OF THE PREFERRED EMBODIMENTS

Hereinafter, preferred embodiments of the present invention will be described with reference to the accompanying drawings.

First Embodiment

A first embodiment of the invention will be described with reference to FIGS. 1 through 3.

Figure 1:
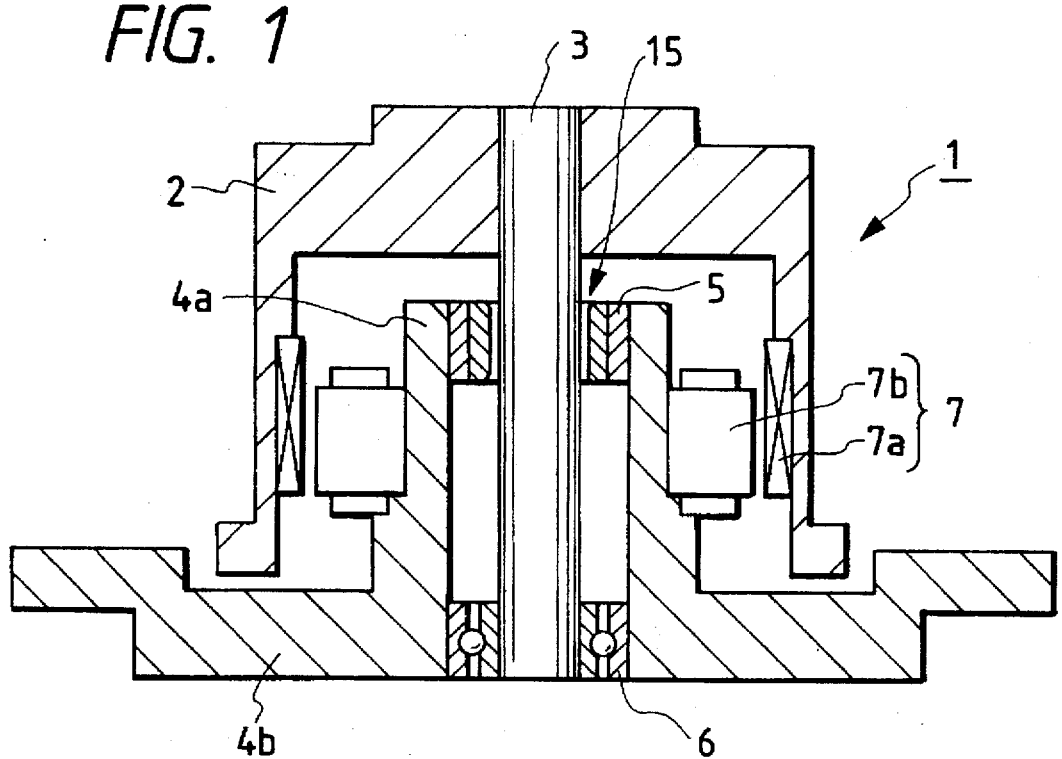
FIG. 1 is a sectional view outlining the arrangement of a spindle motor to which an example of a bearing device is applied, according to a first embodiment of the present invention.

In FIG. 1, a spindle motor 1 is for a magnetic disk device. A shaft 3 is secured to a hub 2 on which a magnetic disk is mounted. The shaft 3 is fitted in a cylindrical housing 4a through a cylindrical sleeve 5 and a ball bearing 6 which are spaced from each other along an axial direction of the shaft 3. The sleeve 5 has dynamic pressure generating grooves in its inner cylindrical surface. Thus, the shaft 3 is rotatably supported on the housing 4a through a radial dynamic pressure bearing 15 with the outer cylindrical surface of the shaft 3 as a radial contact surface and with the inner cylindrical surface of the sleeve 5 as a radial bearing surface.

The cylindrical housing 4a has a disk-shaped base 4b at the bottom in which the housing 4a extends unitedly from the base 4b. The sleeve 5 is fixedly fitted in the upper end portion of the housing 4a. The ball bearing 6 is arranged in the lower end portion of the housing 4a.

A rotor 7a is mounted on the inner cylindrical surface of the hub 2. A stator 7b is mounted on the outer cylindrical surface of the housing 4a. The rotor 7a and the stator 7b form a drive motor in which the inner cylindrical surface of the rotor 7a is confronted with the outer cylindrical surface of the stator 7b. The ball bearing 6 is pre-loaded by axially shifting the rotor 7a made up of permanent magnets, and the stator 7b. That is, the force of attraction between the rotor 7a and the stator 7b is utilized for pre-loading the ball bearing.

Figure 2:
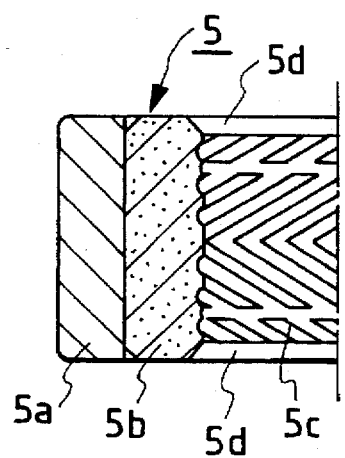
FIG. 2 is a sectional view outlining an example of a dynamic pressure bearing sleeve employed in the bearing device of the first embodiment.
Figure 3:
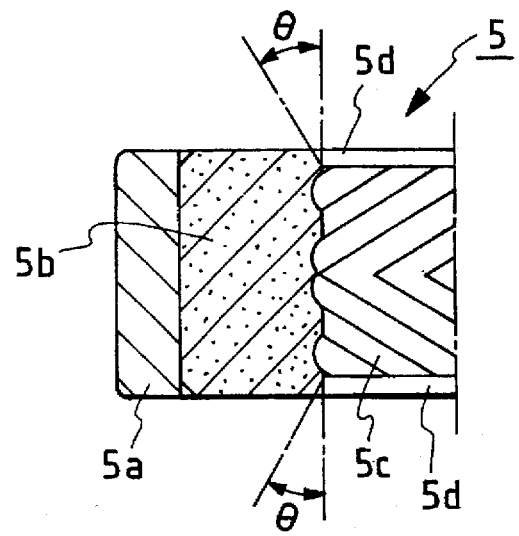
FIG. 3 is also a sectional view outlining another example of the dynamic pressure bearing sleeve employed in the bearing device of the first embodiment.
Figure 4:
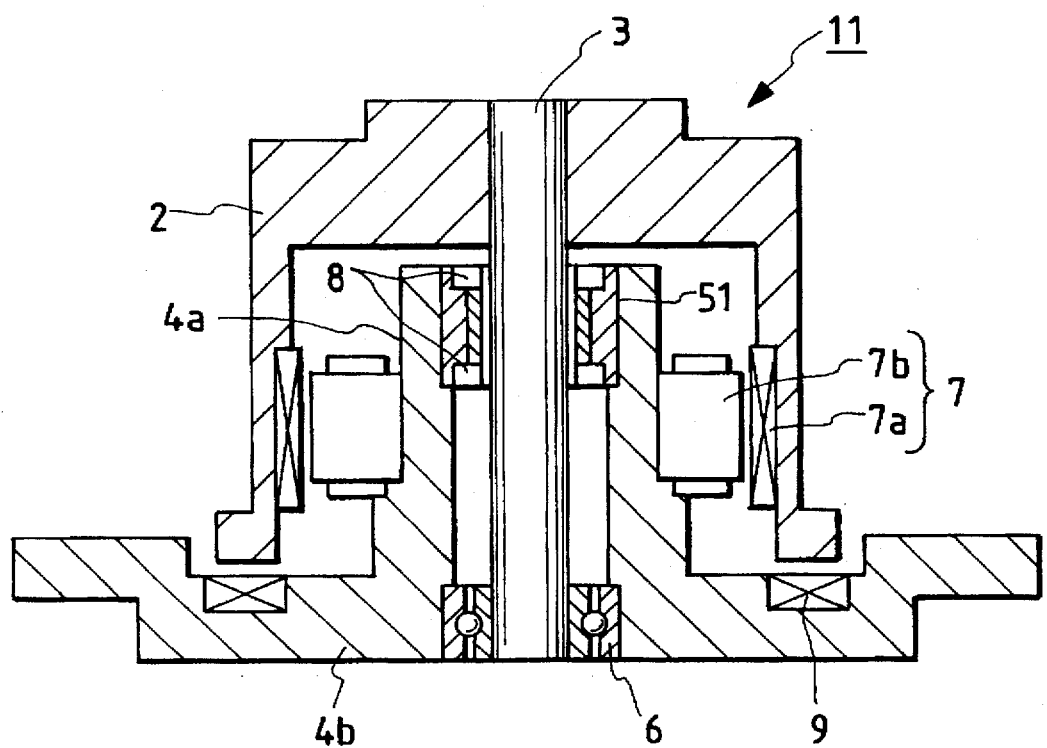
FIG. 4 is a sectional view outlining the arrangement of a spindle motor to which another example of the bearing device is applied, according to a second embodiment of the present invention.

The sleeve 5, as shown in FIG. 2 or 3, includes: an outer cylinder 5a whose the outside diameter is so determined that it can be press-fitted in the housing 4a; and an inner cylinder 5b whose the outside diameter is so determined that it can be press-fitted in the outer cylinder 5a, and which is press-fitted in the outer cylinder 5a. Dynamic pressure generating grooves 5c are herringbone-shaped and formed in the inner cylindrical surface of the inner cylinder 5b. Both end portions of the inner cylindrical surface of the inner cylinder 5b are chamfered, thus forming lubricating fluid reservoirs 5d which are each in the form of a circular cone to hold a lubricating fluid such as oil, grease end magnetic fluid. Hence, the herringbone-shaped grooves 5c are formed between those lubricating fluid reservoirs 5d and 5d.

Each of the lubricating fluid reservoirs 5d holds the lubricating fluid by the surface tension of the lubricating fluid. Preferably, each of the lubricating fluid reservoirs forms an angle θ with the axis of the shaft 3 which is in a range of from 2 to 30°, and the angles θ of the two lubricating fluid reservoirs with respect to the axis of the shaft 3 are equal to each other. If the angle θ is smaller than 2° the amount of lubricating fluid held there is decreased. If the angle θ is larger than 30° the force of holding the lubricating fluid based on the surface tension of the lubricating fluid (hereinafter referred to as "a lubricating-fluid holding force", when applicable) is decreased. Further, if the two angles θ of the lubricating fluid reservoirs of the inner cylinder 5b are equal to each other, the directions of the grooves 5c can be determined independently of the angles θ, which makes it possible to form the grooves 5c with high efficiency.

Moreover, if the angles θ and the lengths of the tapered surfaces of the lubricating fluid reservoirs 5d are symmetrical with respect to the axis of the shaft 3, in forming the grooves 5c it is unnecessary to set the sleeve 5 in a certain direction, which decreases cost required for formation of the grooves 5c, and reduces a rate of forming unacceptable grooves 5c.

The outer cylinder 5a is of a hard metal such as ball-bearing steel (SUJ2) and stainless steel (SUS440C). The inside and outside diameters and both end faces are finished to predetermined dimensional accuracies through cutting, heat treatment, and grinding. The inner cylinder 5b is of a soft metal such as (copper-based or iron-based) sintered metal, copper alloy, and aluminum alloy, and it is formed as follows: the inner cylinder 5b is fixedly Joined to the outer cylinder a by press-fitting or shrink-fitting. Thereafter, the grooves are formed in the inner cylindrical surface by ball rolling. During the ball rolling, the inner cylindrical surface is partially swelled. The swells are removed by grinding them with the outer cylindrical surface as a reference. In addition, when necessary, the inner cylindrical surface of the inner cylinder 5b is brushed with a brush containing abrasive grains, to remove minute protrusions from the inner cylindrical surface.

As is apparent from the above description, in the spindle motor 1, the portion of the shaft which is on the side of the hub 2 as viewed in the axial direction of the shaft 3 (or on the side of the center of gravity of the rotating element) is supported through a radial bearing clearance by the sleeve 5, that is, the radial dynamic pressure bearing. The remaining portion of the shaft is supported by the radial ball bearing 6 which is able to receive radial load and thrust load. A ball bearing is lower in friction and larger in axial load capacity than a thrust dynamic pressure bearing having lubricating fluid. Hence, the spindle motor 1 thus designed is decreased not only in the power consumption but also in the run-out of the non-rotation synchronizing component while being increased in axial load capacity.

In the first embodiment, the sleeve 5 forming the radial dynamic pressure bearing is made up of the combination of the outer cylinder 5a of a hard metal and the inner cylinder 5b of a soft metal. Hence, the inner cylindrical surface of the inner cylinder 5b can be ground with the outside diameter of the outer cylinder as a reference while the outer cylindrical surface of the sleeve 5 being slidably supported with a shoe with one end face of the sleeve 5 positioned with a working machine for raceways of rolling bearings. This makes the inside and outside diameters of the sleeve 5 considerably high in concentricity. Since the inside and outside diameter of the sleeve. 5 are high in concentricity, when the sleeve 5 is fitted in the housing 4a, the sleeve 5 and the ball bearing 6 are also high in concentricity; that is, the rotation of the shaft 3 is improved in accuracy as much.

The ball bearing 6 has a plurality of balls between the outer race and the inner race set inside the outer race. The outer race is secured to the housing 4a, while the inner race is secured to the shaft 4. Hence, the ball bearing 6 may be an ordinary one which is mass-produced, which contributes to a reduction in manufacturing cost.

The inner cylindrical surface of the sleeve 5 is of the soft metal of the inner cylinder 5b. Hence, the dynamic pressure generating grooves 5c can be readily formed by plastic working such as ball rolling, which also contributes to a reduction in manufacturing cost. The outer cylinder 5a of the sleeve 5 may be formed substantially in the same working step as the ball bearing ring. Thus, the bearing device of the invention is suitable to mass production, and low in manufacturing cost. The material of the housing 4a may be aluminum alloy which is a soft metal which can be machined with ease, or stainless steel which can be readily handled.

Second Embodiment

A second embodiment of the invention will be described with reference to FIGS. 4 through 7.

The second embodiment is equal to the above-described first embodiment except that the lubricating fluid for the radial dynamic pressure bearing is a magnetic fluid, a pair magnetic fluid seals 8 are provided for a dynamic pressure bearing sleeve 51 at both ends, respectively, and a permanent magnet 9 is mounted on the base 4b for pre-loading to the ball bearing 6.

Figure 5:
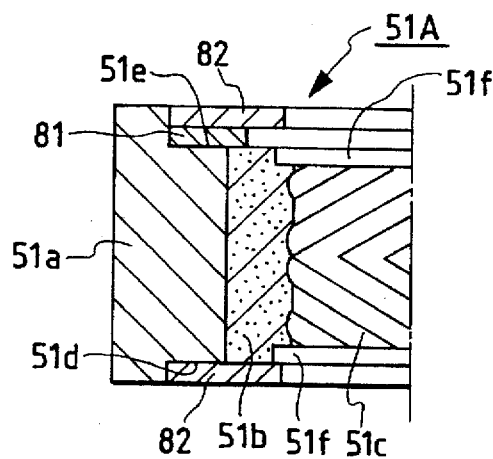
FIG. 5 is a sectional view outlining an example of a dynamic pressure bearing sleeve employed in the bearing device of the second embodiment.

As shown in FIG. 5, a sleeve 51A includes a ferromagnetic outer cylinder 51a and an inner cylinder 51b. Annular recesses 51d and 51e for mounting magnetic fluid seals are formed in the inner cylindrical surfaces of both end portions of the ferromagnetic outer cylinder 51a, respectively, in such a manner that those recesses 51d and 51e are different in depth from each other. On the other hand, the inner cylinder 51b is shaped so that both end faces are flush with the bottoms of the annular recesses 51d and 51e, respectively, when the inner cylinder 51b is fitted in the outer cylinder 51a. In addition, a pair of lubricating fluid reservoirs which are cylindrical and larger in diameter than the diameter of the inner cylindrical surface of the inner cylinder 51b are formed in the inner cylindrical surfaces of both end portions of the inner cylinder 51b.

The magnetic fluid seal 8 (on the side of the hub 2) of the sleeve 51A is designed as follows: A permanent magnet 81 which is magnetized axially and shaped like an annular plate is fitted in the annular recess 51e. A pole piece 82 is formed of ferromagnetic material and shaped like an annular plate having an inside diameter smaller than the permanent magnet 81. The pole piece 82 is laid on the permanent magnet 81. On the other hand, the magnetic fluid seal 8 (on the side of the base 4b) of the sleeve 5 is such that another pole piece 82 is fitted in the annular recess 51d.

Figure 6:
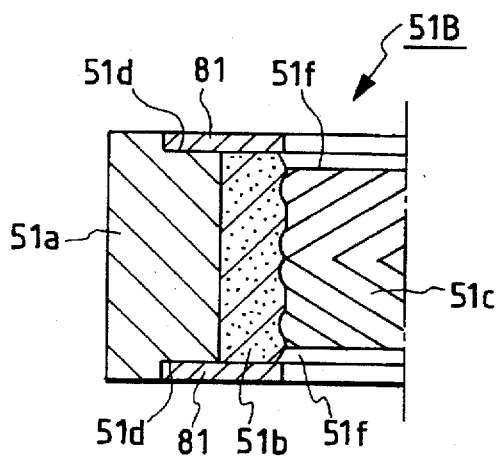
FIG. 6 is a sectional view outlining another example of the dynamic pressure bearing sleeve employed in the bearing device of the second embodiment.

FIG. 6 shows another example of the sleeve 51B which includes a ferromagnetic outer cylinder 51a, and an inner cylinder 51b. A pair of annular recesses 51d and 51d for mounting magnetic fluid seals are formed in the inner cylindrical surfaces of both end portions of the outer cylinder 51a to the same depth, respectively. On the other hand, the inner cylinder 51b is shaped so that both end faces are flush with the bottoms of the annular recesses 51d and 51d. On the other hand, a pair of lubricating fluid reservoirs 51f, which are conical, are formed in the inner cylindrical surfaces of both end portions of the inner cylinder 51b. The sleeve 51B has a pair of magnetic fluid seals 8 and 8 at both ends. More specifically, the magnetic fluid seals 8 are such that permanent magnets 81 and 81 which are magnetized radially or axially and shaped like an annular plate are fitted in the annual recesses 51d and 51d, respectively.

Figure 7:
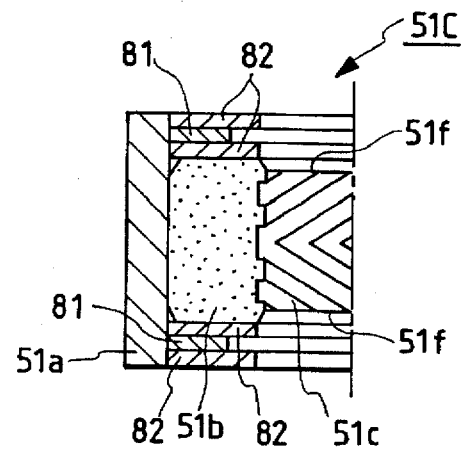
FIG. 7 is a sectional view outlining another example of the dynamic pressure bearing sleeve employed in the bearing device of the second embodiment.

FIG. 7 shows another example of the sleeve 51C which includes an outer cylinder 51a and an inner cylinder 51b. In the sleeve 51C, the outer cylinder 51a is larger in axial length than the inner cylinder 51b. The inner cylinder 51b is fitted in the outer cylinder 51a in such a manner that the inner cylinder 51b and the outer cylinder 51a are coaxial with each other, so that a pair of annular recesses are formed in the sleeve at both ends by the inner cylindrical surface of the outer cylinder 51a and both add faces of the inner cylinder 51b. Under this condition, a pair of magnetic fluid seals 8 and 8, which are each made up of two pole pieces 82 and a permanent magnet 81 held between those pole pieces 82, are fitted in the annular recesses thus formed. In the sleeve 51C, dynamic pressure generating grooves 51c are so shaped by cutting that they are substantially rectangular in section; however, they may be so modified that they are arcuate in section as shown in FIG. 3.

Hence, the second embodiment has the following effects or merits in addition to those of the first embodiment: The magnetic fluid seals 8 prevent the lubricating fluid from leaking or splashing during transportation or during rotation, with a result that the spindle motor 11 is improved both in reliability and in durability.

The dynamic pressure bearing having the herringbone-shaped grooves 51c is able to seal the lubricating fluid by itself. Hence, in the second embodiment, unlike the first embodiment, it is unnecessary for the sleeve to have the magnetic fluid seals. On the other hand, in the case of a spindle motor for a magnetic disk device, it is preferable that the sleeve has the magnetic fluid seals since the clearance between the magnetic disk and the head is small but the splashing of lubricating fluid must be completely prevented during rotation in the magnetic disk device. In this case, the sleeve may be modified for reduction in manufacturing cost in such a manner that the magnetic fluid seal 8 is provided on the sleeve at the one end (which is on the side of the hub 2) and no magnetic fluid seal is provided on the sleeve at the other end (which is on the side of the base 4b).

From a structural view point, any one of the sleeves shown in FIGS. 5 through 7 may be employed. In order to decrease the number of components and the manufacturing cost it is preferable to use the sleeve shown in FIG. 6. In this connection, it is desirable to employ a plastic magnet as the permanent magnet 81 because it is suitable for mass production. Each of the above-described sleeves 51A through 51C has the lubricating fluid reservoirs 51f, which complements the lubricating fluid which may be decreased by being splashed or evaporated. Hence, in this case, the spindle motor 11 is further improved in durability.

It is preferable that the magnetic fluid which is the same as the example where the magnetic fluid seals are used is employed as the lubricating fluid for the radial dynamic pressure bearing because any change of performance is not raised by the mixture of them. Even in the case where the magnetic fluid seals are used, it is natural to the ordinary lubricating fluid such as non-magnetic fluid can be employed as the lubricating fluid for the radial dynamic pressure bearing. But, in this case, it is preferable that the magnetic fluid is composed of basic oil which is the same as basic oil of the lubricating fluid. In addition, if each sleeve 5 for the dynamic pressure bearing is mounted at two points spaced from each other in the axial direction, it may be unnecessary to arrange the ball bearing 6.

In the second embodiment, the hub 2 is made of ferromagnetic material, so that the permanent magnet 9 is mounted on the base 4b. However, in the case where the hub 2 is made of non-ferromagnetic material, the spindle motor may be modified in such a manner that the permanent magnet 9 is mounted on the hub 2 and a ferromagnetic body is mounted on the base 4b. On the other hand, the preloading force to the ball bearing may be obtained by utilization of the force of attraction between the rotor 7a and the stator 7b in the first embodiment in addition to the force of attraction between the ferromagnetic body and the permanent magnet.

In the above-described first and second embodiments, the shaft 3 may be made of stainless steel. In this case, it is preferable that the inner cylinder 5b of the sleeve 5 is made of a copper-based sintered metal since the shaft 3 and the sleeve 5 are high in sliding characteristic when the motor is started or stopped, and they are scarcely rusted. In addition, the copper alloy of the inner cylinder 5b may be replaced with the brass-based sintered metal which is similar to a material of an oil-impregnated bearing. In this case, since the sintered material is mass-produced, the motor is reduced in manufacturing cost as much.

In the case where the above-described sintered metal is employed, it should be low in porosity so that the dynamic pressure generated in the inner surface of the sleeve 5 is maintained. However, the sleeve may be so modified that the porosity of the sintered metal is suitably selected to hold the lubricating fluid in the porous portion of the sleeve to thereby supply the lubricating fluid to the bearing surface. On the other hand, the inner cylinder 5b of the sleeve 5 may be made of free-cutting brass instead of the above-described sintered metal. This is advantageous in that the dynamic pressure generated during rotation is maintained, and the load capacity is increased.

In the first and second embodiments, as described above, the sleeves 5 and 51 are formed as follows: That is, the outer cylinders 5a of hard metal, and the inner cylinders 5b and 51b of soft metal are formed separately, and the inner cylinders 5b and 51b are fitted in the outer cylinders 5a and 51a, respectively. However, the invention is not limited thereto or thereby; that is, the sleeve may be formed by using case carburizing steel in its entirety. In this case, the outer cylindrical surface and at least one end face of the sleeve are subjected to carburizing heat treatment to harden its outer layer, and the dynamic pressure generating grooves are formed in the inner cylindrical surface in the above-described manner which remains soft. In addition, the sleeve 5 or 51 may be made of a hardened steel such as SUS440 and SUJ2 in its entirety. In this case, only the outer layer is subjected to induction hardening.

Figure 8:
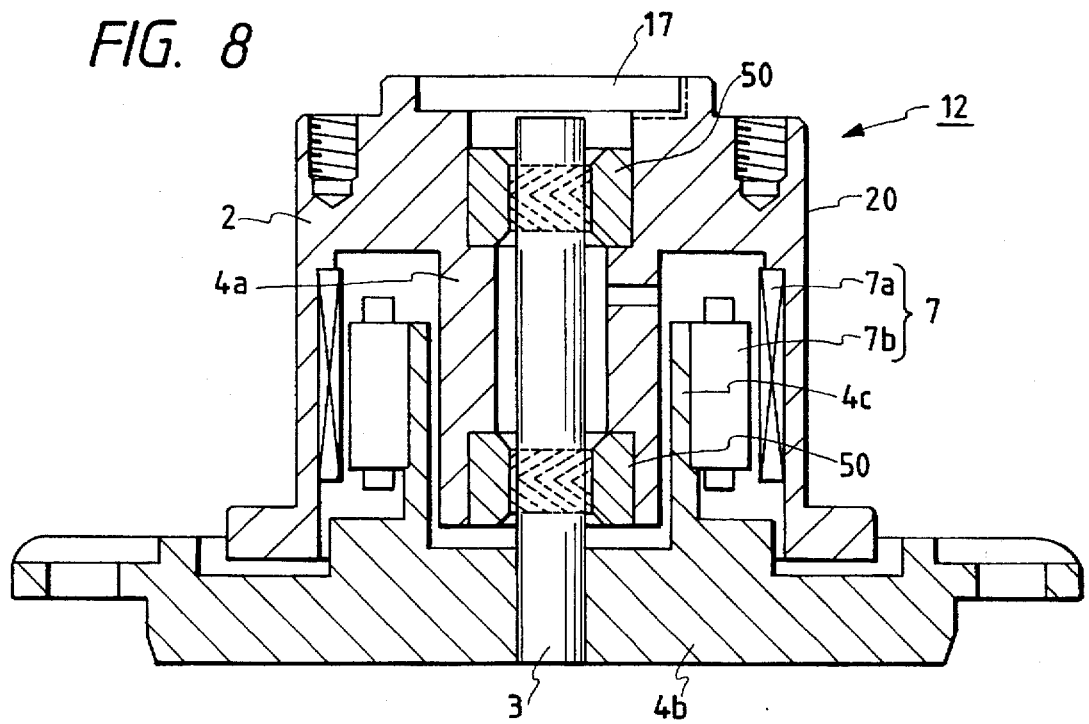
FIG. 8 is a sectional view outlining the arrangement of a spindle motor to which another example of the bearing device is applied, according to a third embodiment of the present invention.
Figure 9:
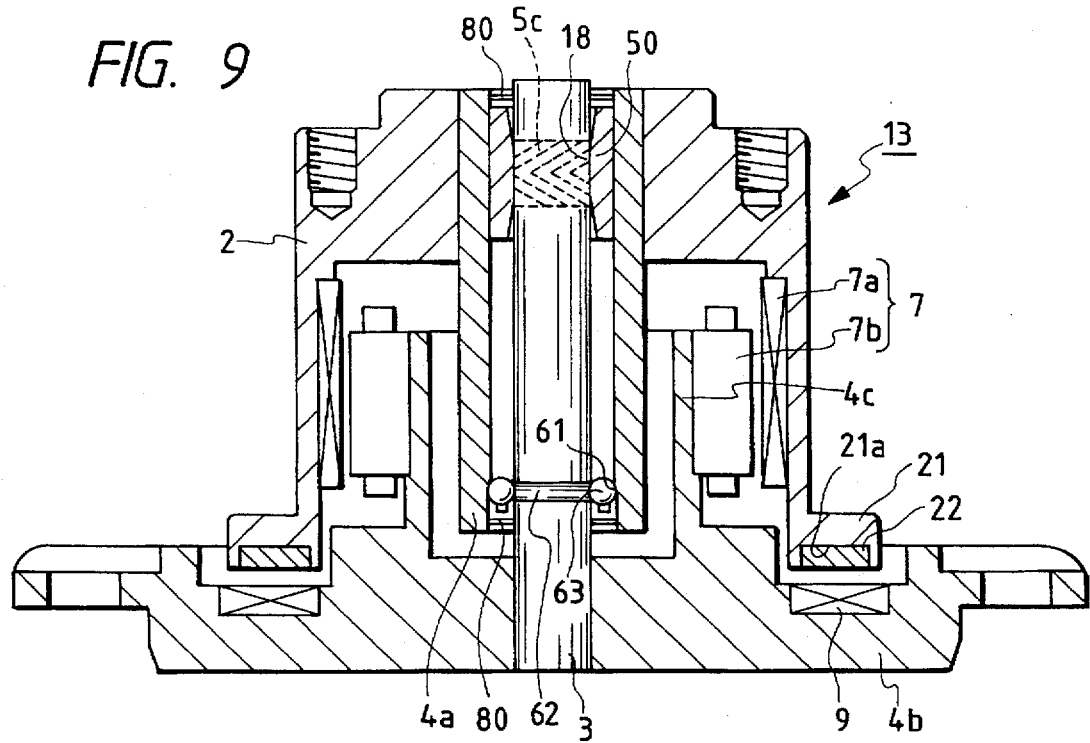
FIG. 9 is a sectional view outlining the arrangement of a spindle motor to which another example of the bearing device is applied, according to a fourth embodiment of the present
Figure 10:
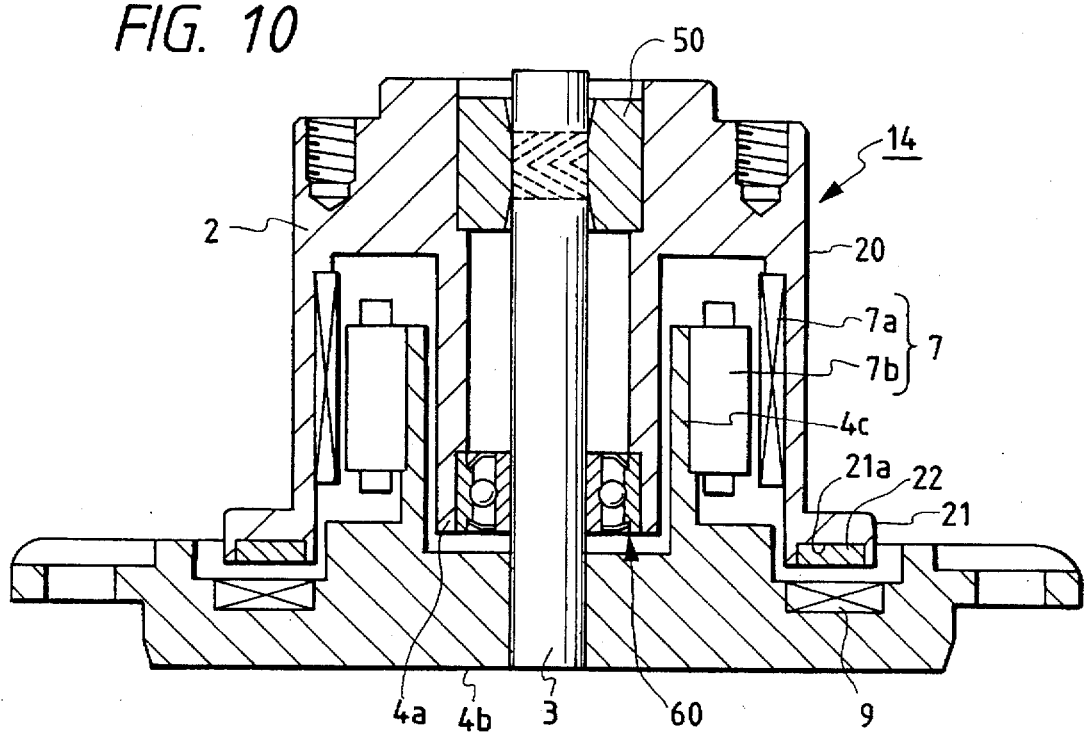
FIG. 10 is a sectional view outlining the arrangement of a spindle motor to which another example of the bearing device is applied, according to a fifth embodiment of the present invention.

FIGS. 8, 9 and 10 are sectional views outlining the structures of other examples of the spindle motors, which constitutes third through fifth embodiments of the invention, respectively (described later). In the third through fifth embodiments, unlike the above-described first and second embodiments, the sleeves 50 are formed as follows: That is, each sleeve 50 is made of a hardened steel such as SUS440 and SUJ2, being in the form of a cylinder in its entirety. The outer cylindrical surface and at least one end face of the cylinder (or sleeve 50) are subjected to induction hardening, so that only the outer layer of the cylinder is hardened to $H_2C$ 20 to 65. Thereafter, the inner cylindrical surface of the cylinder which is not hardened is subjected to ball rolling, to form dynamic pressure generating grooves. The swells of the inner cylindrical surface which is due to the ball rolling operation are ground with the outer cylindrical surface as a reference.

In those spindle motors 12, 13 and 14, unlike the spindle motors 1 and 11 of the first and second embodiments, a shaft 3 is secured to a base 4b, a housing 4a is formed integrally with a hub 2, and the sleeves 50 fitted in the housing 4a are rotated around the shaft 3. Accordingly, the base 4b and the housing 4a are individual components. The base 4b has a cylinder 4c at the center with which the housing 4a is loosely engaged. A stator 7b is mounted on the outer cylindrical surface of the cylinder 4c.

Third Embodiment

In the spindle motor 12 shown in FIG. 8, two dynamic pressure bearing sleeves 50 are arranged between the shaft 3 and the housing 4a in such a manner that they are spaced from each other along the shaft 3. The inner cylindrical surfaces of the sleeves 50 and the cylindrical surface of the shaft 3 form radial dynamic pressure bearings, which receive radial load. The dynamic pressure generating grooves of the radial dynamic pressure bearing are formed in the inner cylindrical surfaces of the sleeves 50 in the above-described manner.

In the third embodiment, the hub 2 and the housing 4a are formed into a unit member 20. A thrust plate 17 is placed on the upper end face of the housing 4a of the member 20 to receive the upper end face of the shaft 3. The thrust plate 17 and the upper end face of the shaft 3 form a thrust dynamic pressure bearing, which receives axial load. The dynamic pressure generating grooves of the thrust dynamic pressure bearing may be formed either in the upper end face of the shaft 3 or in the receiving surface of the thrust plate 17.

Hence, the inner cylindrical surface of the sleeve 50 can be ground with the outside diameter of the sleeve 50 as a reference while the outer cylindrical surface of the sleeve being slidably supported with a shoe with one end face of the sleeve positioned with a working machine for raceways of rolling bearings. This makes the inside and outside diameters of each of the sleeves 50 considerably high in concentricity. Since the inside and outside diameter of the sleeve 50 are high in concentricity, the sleeves 50 are fitted in the housing 4a with high concentricity; that is, the shaft 3 is improved in the accuracy of rotation as much.

On the other hand, in the third embodiment, unlike the first and second embodiment, the sleeves 50 are each in the form of a cylinder made of iron-based metal, and it is so heat-treated that its outer layer is harder than the inner layer. Hence, the sleeve 50 is much lower in manufacturing cost than the sleeve according to the first or second embodiment which is formed by combining the outer layer member and the inner layer member with each other which are formed as individual components.

Fourth Embodiment

In the spindle motor 13 shown in FIG. 9, of two points spaced from each other along the shaft 3 between the shaft 3 and the housing 4a, a ball bearing is arranged at the lower point closed to the base 4b and the sleeve 50 for dynamic pressure bearing is arranged at the upper point closed to the upper end face of the hub 2, The inner cylindrical surface of the sleeve 50 and the cylindrical surface of the shaft 3 form a radial dynamic pressure bearing to receive a radial load at the axially upper end portion of the shaft 3 closed to the hub 2.

In the fourth embodiment, a hub 2 and a housing 4a are individual components; that is, the housing 4a is in the form of a relatively long cylinder, and its upper portion is fitted in the hub 2. The outer raceway surface 61 of the ball bearing is formed in the lower end portion of the inner cylindrical surface of the housing 4a. The inner raceway surface 62 is formed in the cylindrical surface of the shaft 3 in correspondence to the outer raceway surface. The ball bearing is formed from those raceway surfaces 61 and 62, and balls 63 arranged between them. The ball bearing thus formed receives both axial load, and radial load provided on the side of the lower end of the shaft 3 (or on the side of the base 4b).

In order to pre-load the ball bearing, an attracting steel plate 22 is fitted in 8 recess 21a formed in the lower surface of a flange 21 which is extended from the lower end of the hub 2, while a magnet 9 is mounted on the upper surface of the base 4b confronting the attracting steel plate 22; that is, the ball bearing is pre-loaded by the force of attraction between the attracting steel plate 22 and the magnet 9. Instead of the attracting steel plate 22, a magnet may be employed so that the force of attraction between those magnets is utilized to pre-load the ball bearing. Alternatively, the spindle motor may be so modified that the magnet is fitted in the recess 21a of the hub 2, while the steel plate is mounted on the base 4b. Furthermore, the magnet 9 on the stationary side (or on the side of the base 4b) may be either a permanent magnet or an electromagnet.

The housing 4a in the form of a relatively long cylinder has a pair of non-contact seals 80 respectively at both ends as viewed in the axial direction. The provision of the non-contact seals 80 is to prevent the entrance of foreign matters, and to prevent the lubricating fluid from initially splashing which has stuck onto the bearing surface during assembling. Instead of the non-contact seal 80, a labyrinth seal may be employed.

Hence, in the fourth embodiment, similarly as in the case of the third embodiment, the inner cylindrical surface of the sleeve 50 can be ground with the outside diameter of the sleeve 50 as a reference, with a result that the inside and outside diameters of the sleeve 50 are considerably high in concentricity. Since the inside and outside diameter of the sleeve 50 are high in concentricity, the sleeve 50 fitted in the housing 4a, and the ball bearing are high concentricity. Therefore, the shaft 3 is improved in the accuracy of rotation as much. In addition, similarly as in the case of the third embodiment, the sleeve 50 is in the form of an integrated cylinder, and the outer layer of the sleeve 50 is made harder than the inner layer by heat treatment. Hence, the fourth embodiment is much lower in manufacturing cost than the first or second embodiment.

In the fourth embodiment, similarly as in the case of the first or second embodiment, the remaining bearing (other than the dynamic pressure bearing sleeve 50) is the ball bearing. Hence, the spindle motor 13 according to the fourth embodiment is decreased not only in the power consumption but also in the run-out of the non-rotation synchronizing component while being increased in axial load capacity.

In addition, preferably the inner cylindrical surface of the sleeve is crowned to prevent the sleeve 50 and the shaft 3 from being damaged during revolution when the spindle motor is started or stopped.

Fifth Embodiment

In the spindle motor 14 shown in FIG. 10, of two points spaced from each other along the shaft 3 between the shaft 3 and the housing 4a, a deep groove ball bearing 60 is arranged at the lower point closed to the base 4b and the sleeve 50 for dynamic pressure bearing is arranged at the upper point closed to the upper end face of the hub 2. The inner cylindrical surface of the sleeve 50, and the cylindrical surface of the shaft 3 form a radial dynamic pressure bearing, which receives a radial load at the axially upper end portion of the shaft 3. The deep groove ball bearing 60 receives both an axial load and a radial load at the lower end portion of the shaft 3. Furthermore, in the fifth embodiment, the hub 2 and the housing 4a are provided as a unit member 20.

As described above, in the fifth embodiment, the other bearing is the deep groove ball bearing 60 which is mass-produced. Hence, the fifth embodiment has the following effects or merits in addition to those of the above-described fourth embodiment: That is, when compared with the fourth embodiment in which it is necessary to form the raceway surfaces in the housing 4a and the shaft 3, the fifth embodiment is low in manufacturing cost.

In the fifth embodiment, unlike the fourth embodiment, no non-contact seal 8 is provided; however, in order to prevent the scattering of dust, it is preferable to provide a non-contact seal or labyrinth seal above the sleeve 50 which functions as a radial dynamic pressure bearing.

While the first through fifth embodiments have been described, the invention is not limited thereto or thereby.

That is, another example of the spindle motor in which the sleeve is in the form of an integrated cylinder may be provided in such a manner that the sleeve is made of aluminum alloy in its entirety and the outer cylindrical surface and at least one end face of the sleeve are subjected to alumite treatment to harden the outer layer. Under this condition, the dynamic pressure generating grooves are formed in the inner cylindrical surface of the sleeve in the above-described manner which is not hardened. Alternatively, a sleeve of aluminum alloy is subjected to alumite treatment in its entirety, to form the whole surface layer of the sleeve into a hardened layer. The inner cylindrical surface of the sleeve which has been hardened is ground until the inner cylindrical surface appears which is not hardened. Under this condition, the dynamic pressure generating grooves are formed in the soft inner cylindrical surface of the sleeve in the above-described manner.

In order to prevent occurrence of cracks in the outer circumferential surface of the sleeve 5, it is preferable that the outer circumferential surface has the hardness of $H_RC$ 40 or more. On the other hand, in order to readily work the dynamic pressure generating grooves 5c in the inner circumferential surface of the sleeve 5, it is preferable that the inner circumferential surface has the hardness of $H_RC$ 39 or less.

If the lubricating fluid of the radial dynamic pressure bearing is electrically conductive, then in the spindle motor the grounding function between the members on the rotational side and the members on the stationary side may be more positive.

In the spindle motors 1 and 11 according to the first and second embodiments, the shaft 3 is rotated together with the hub 2. Hence, when compared with a spindle motor in which its housing 4a is turned, those spindle motors 1 and 11 are small in centrifugal force so that the lubricating fluid is scarcely splashed during rotation. Hence, according to the invention, a spindle motor may be formed in which, although no magnetic fluid seal is employed, the lubricating fluid is scarcely splashed.

In the first or second embodiment, the shaft 3 is rotated. In this case, the rotor 7a and the stator 7b may be mounted as follows: the rotor 7a (or the stator 7b) is coupled directly or indirectly to the housing 4a, and the stator 7b (or rotor 7a) is coupled directly or indirectly to the shaft 3 in such a manner as to confront with the rotor 7a (or the stator 7b).

In the case where, as in the case of the third, fourth or fifth embodiment, the structure of the spindle motor is such that the housing 4a is rotated which is secured to or made integral with the hub 2, both end portions of the housing (as viewed in the axial direction) are supported by the stationary shaft through the radial dynamic pressure bearing (or the sleeve 50) and the ball bearing (the two radial dynamic pressure bearings in the third embodiment). Hence, the radial load is applied to the portion of the shaft from outside which is located between the two bearings as viewed in the axial direction. Therefore, the degree of run-out revolving of the housing 4a is smaller than in the case of the first or second embodiment.

In the case where the spindle motor is set horizontally during use, a radial load applied to the hub 2 is great. Therefore, it is preferable that the ball bearing is provided on the side of the hub 2 of the housing 4a, while the dynamic pressure generating bearing is on the side of the base 4b. That is, in the case where the radial load is great, the dynamic pressure bearing section is adversely affected in durability when the motor is started or stopped. However, this problem may be substantially solved by arranging the ball bearing on the side of the hub 2. In this case, the hub 2 is liable to be affected by the ball bearing when compared with the case where the dynamic pressure bearing is arranged on the side of the hub 2 of the housing 4a and the ball bearing is on the side of the base. Therefore, the liability of the hub 2 lessens the effect of decreasing the run-out of the non-rotation synchronizing component. However, when compared with the case where two ball bearings are employed, the run-out of the non-rotation synchronizing component is decreased as much as the assembling error is not effective which is a cause for the deterioration in the run-out of the non-rotation synchronizing component of the spindle motor.

The ball bearing is lower in friction and larger both in radial load capacity and in axial load capacity than the dynamic pressure bearing having lubricating fluid. Hence, the bearing devices according to the first, second, fourth and fifth embodiments, are low in torque, and small in power consumption.

Sixth Embodiment

Figure 11:
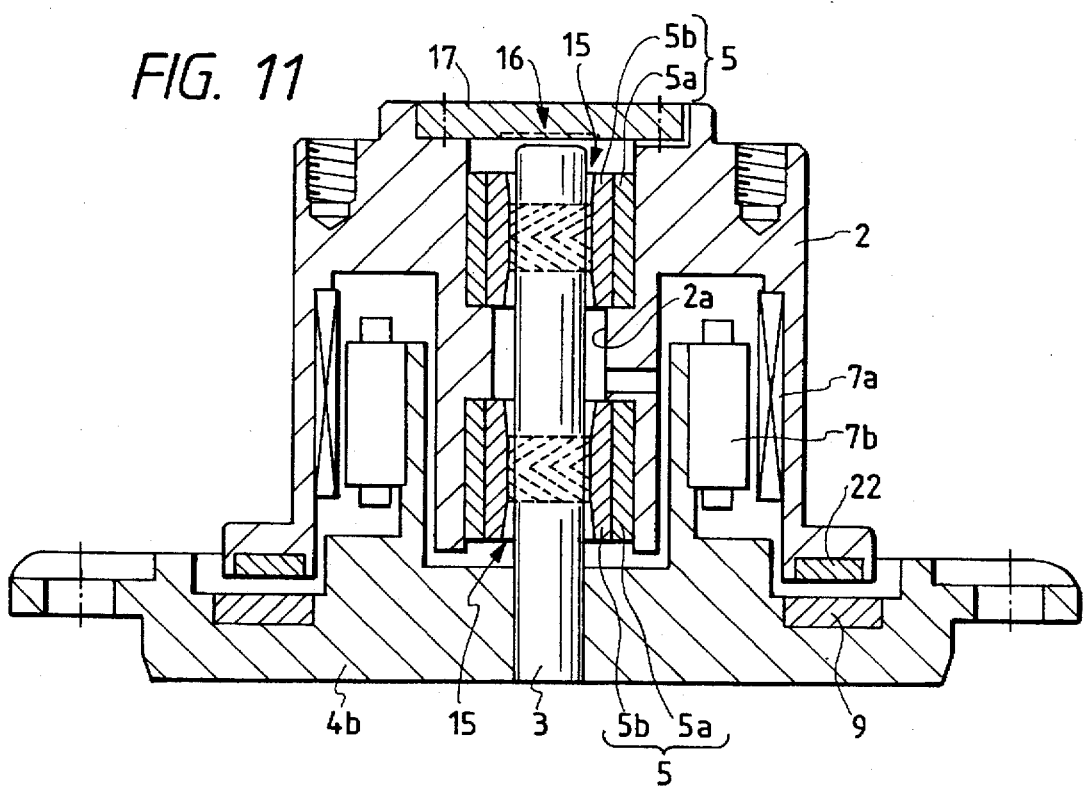
FIG. 11 is a cross-sectional view showing a spindle motor in which the dynamic pressure bearing of the sixth embodiment of the present invention is installed.

The fundamental arrangement of the spindle motor of the sixth embodiment of the present invention is substantially the same as that of the first conventional example. However, as shown in FIG. 11, two sleeves 5 as a rotary member are fitted in the insertion hole 2a formed in the hub 2 to which the rotor is attached. The sleeves 5 are integrally fixed to the insertion hole 2a. The sleeves 5 are arranged at a predetermined interval in the axial direction (upward and downward direction).

The shaft 3, which is a stationary member, is inserted from the lower side into the insertion hole 2a. when the lower end portion of the shaft 3 is fixed to the base 4b, the sleeve 5 and the hub 2 can be rotated.

A thrust load generated between the shaft 3 and the hub 2 is supported by a thrust bearing formed by the thrust plate 17, which is attached to the upper end opening of the insertion hole 2a, and the upper end surface of the shaft 3. In this connection, a dynamic pressure generating groove for the thrust bearing 16 is formed on at least one of the upper end surface of the shaft 3 and the surface of the thrust plate 17.

Figure 12A:
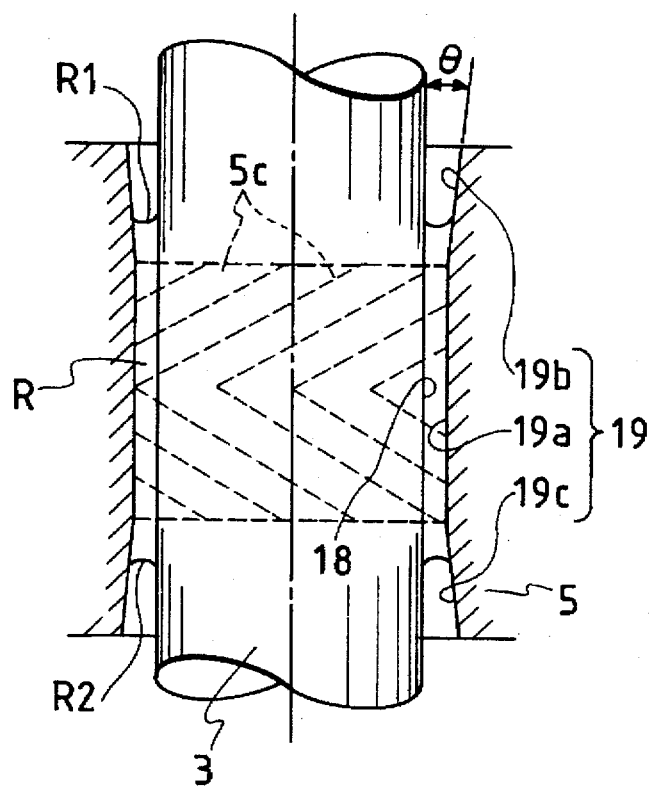
FIGS. 12A and 12B are views showing a dynamic pressure bearing of the sixth embodiment of the present invention.
Figure 12B:
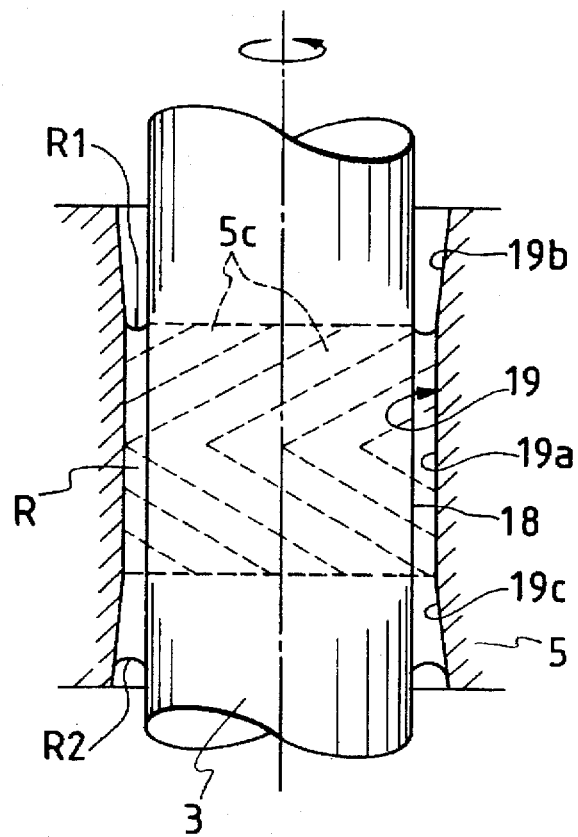

Radial loads generated between the shaft 3 and the sleeves 5 are supported by the two radial bearings 15 which are dynamic pressure bearings. Each radial bearing 15 is formed by the outer circumferential surface of the shaft 3 and the inner circumferential surface of each sleeve 5. As shown in FIGS. 12A and 12B, these two radial bearings 15 are composed in such a manner that the cylindrical radial bearing surface 18 formed the outer circumferential surface of the shaft 3 is opposed to the radial bearing surface 19 formed on the inner circumferential surface of the sleeve 5, through a predetermined clearance formed between them in the radial direction.

Tapered portions 19b and 19c are formed at both end portions in the axial direction of the radial bearing surface 19 formed on the sleeve 5, respectively. Specifically, the radial bearing surface 19 formed on the sleeve 5 includes: two tapered portions 19b, 19c formed at both end portions in the axial direction; and a cylindrical bearing surface body 19a formed between the two tapered portions 19b and 19c.

Each tapered portion 19b, 19c includes a tapered surface to hold the lubricating fluid by the action of surface tension. The tapered surface is formed in such a manner that the tapered surface is separated from the radial bearing surface 18 formed on the shaft 3 as it is also separated from the bearing surface body 19a.

In this case, when each inclination angle θ of the tapered surface of each tapered portion 19b, 19c with respect to the axis is too large, the holding capacity to hold the lubricating fluid by the action of a capillary action is reduced. Therefore, it is preferable that the inclination angle is determined to be in a range from 2° to 30°. In this connection, the inclination angles of the tapered surfaces may be different from each other, and also the lengths in the axial direction of the tapered surfaces may be different from each other.

A herringbone-shaped groove 5c for generating a dynamic pressure is formed on the bearing surface body 19a of the sleeve 5. Further, when an outer cylinder 5a of the sleeve 5 is made of hard material, the sleeve 5 can be easily press-fitted into an insertion hole 2 formed in the hub 2.

The bearing clearance is charged with lubricating fluid R. Examples of usable lubricating fluid R are oil, grease and magnetic fluid.

An overall bearing surface 19 of the sleeve 5, which is a rotary member, is coated with a lubricating fluid repellent agent having a characteristic of repelling lubricating fluid R. When mineral oil or synthetic oil is used as lubricating fluid R, it is preferable that a fluorine-base surface improvement agent is used as the lubricating fluid repellent agent. When fluorine oil is used as lubricating fluid R, silicon oil is preferably used as the lubricating fluid repellent agent.

The lubricating fluid repellent agent may be coated by a well known coating method such as coating, dipping, vapor-deposition and spraying.

In the same manner as that of the fourth and fifth embodiments, an annular steel sheet 22, which is coaxial with the shaft 3, is fixed onto a lower surface of the outer circumferential portion of the hub 2 to which the rotor is attached. Also, a magnet 9 is fixed onto an upper surface of the base 4b opposed to the annular steel sheet 22 in the upward and downward direction. The steel sheet 22 and the magnet 9 may be omitted, and the position of the rotor 7a of the motor in the axial direction may be shifted from the position of the stator 7b in the axial direction, so that a force of attraction can act in the axial direction. Alternatively, both forces of attraction may be simultaneously used.

In this connection, hollow portions are formed between the two radial bearings 15 and also between the upper radial bearing 15 and the thrust bearing 16, and the diameters of these hollow portions are larger than the diameter of the radial bearing surface 19 on which the sleeve 5 is provided.

By the action of the rotor 7a fixed to the hub 2 and the stator 7b fixed to the base 4b, the hub 2 and sleeve 5 are rotated at high speed.

Next, the mode of operation and the effect of the dynamic pressure bearing will be explained below.

As shown in FIG. 12A, under the condition that the sleeve 5 is not rotated, the lubricating fluid R is provided in a bearing clearance formed between the bearing surface 19 on the sleeve 5 and the bearing surface 18 on the shaft 3. Both end portions R1 and R2 of the lubricating fluid R are respectively held in the tapered portions 19b and 19c by the action of surface tension of lubricating fluid R. Length of the portion of lubricating fluid R held in the tapered portions is determined by the balance between the surface tension of lubricating fluid R existing in the upper tapered portion 19b and the surface tension of lubricating fluid R existing in the lower tapered portion 19c. When the inclination angles of the tapered surfaces of both tapered portions 19b, 19c are the same, the length of the portion on the upper side and the length of the portion on the lower side are substantially the same.

When the sleeve 5 is rotated under the condition described above, the lubricating fluid R existing in the tapered portions 19b, 19c is fed onto the bearing surface body 19a with pressure by the action of the groove 5c for generating dynamic pressure. However, errors are usually caused in the machining process of the groove 5c for generating dynamic pressure. Therefore, the distribution of pressure of lubricating fluid generated by the groove 5c becomes unsymmetrical. Accordingly, during the rotation of the bearing, the distribution of lubricating fluid R deviates from the center to one of the tapered portions. For example, when the feeding force caused by the upper groove 5c is stronger than the feeding force caused by the lower groove, the distribution of lubricating fluid R deviates to the lower tapered portion 19c as shown in FIG. 12B. In this case, the lubricating fluid R fed to the lower tapered portion 19c is held in the lower tapered portion 19c by the action of surface tension of the lubricating fluid R. Due to the foregoing, while the sleeve 5 is rotated, there is no lubricating fluid R in the upper tapered portion 19b.

When the bearing surface 19 formed on the sleeve 5 is not coated with a lubricating fluid repellent agent like the conventional example, a part of the lubricating fluid R contacting with the bearing surface body 19a flows on the bearing surface 19 and moves to the tapered surface of the tapered portion 19b by the wettability of the bearing surface 19 with respect to the lubricating fluid R. Since the sleeve 5 is rotated, the lubricating fluid R which has moved onto the tapered surface further moves upward along the tapered surface by the action of a centrifugal force caused by the rotation of the sleeve 5. After the lubricating fluid R has reached an upper end of the tapered surface, it splashes outside the bearing by the action of centrifugal force.

On the other hand, in the sixth embodiment of the present invention, since the bearing surface 19 formed on the sleeve 5 is coated with a lubricating fluid repellent agent, the wettability of the bearing surface 19 with respect to the lubricating fluid R is greatly reduced. The lubricating fluid R on the bearing surface body 19a is pushed into the central portion of the bearing clearance in the axial direction by the action of a capillary action. Therefore, when the lubricating fluid R is repelled by the lubricating fluid repellent agent, it moves to the center portion of the bearing clearance in the axial direction. Accordingly, the lubricating fluid R does not flow on the bearing surface 19 from the bearing surface body 19a to the upper tapered portion 19b, so that splash of the lubricating fluid R from the upper tapered portion 19b can be suppressed during the rotation of the bearing. Accordingly, a decrease in the amount of lubricating fluid R held in the bearing can be prevented. Further, splash and leakage of the lubricating fluid held in the lower tapered portion 19c can be prevented by the action of a capillary action and the lubricating fluid repellent agent. Therefore, no lubricating fluid splashes and leaks outside the bearing.

Even if the distribution of the lubricating fluid R deviates to the lower side or the upper side while the bearing is rotated, it is possible to prevent the lubricating fluid R from splashing outside from the radial bearings A and B because of the action of a capillary action and the lubricating fluid repellent agent.

Concerning the nonsymmetry of the distribution of pressure caused by the groove 5c for generating dynamic pressure, when a bearing is machined in such a manner that a predetermined nonsymmetry is positively given to the bearing without depending upon the errors caused in the process of machining, it is possible to cause the pressure distribution of the lubricating fluid R to securely deviate to one of the lower side and the upper side in accordance with the bearing arrangement.

In the sixth embodiment, the hub 2 and the sleeve 5 are separately made, however, it is possible to integrate them into one body like the conventional example. When the hub 2 and the sleeve 5 are integrated into one body, the lubricating fluid repellent agent can be easily coated on the sleeve 5 which is a rotary member, so that the manufacturing cost can be reduced.

In the sixth embodiment, only the bearing surface 19 of the sleeve 5, which is a rotary member, is coated with the lubricating fluid repellent. However, it is preferable that the bearing surface 18 of the shaft 3, which is a stationary member, is also coated with the lubricating fluid repellent agent. When the bearing surface 18 of the shaft 3 is coated with the lubricating fluid repellent agent, the lubricating fluid held in the bearing clearance between the bearing surface 18 of the stationary member and the bearing surface 19 of the rotary member is pushed into the center portion of the bearing clearance by the action of a capillary action when the dynamic pressure bearing is not rotated, for example, when the dynamic pressure bearing is transported or stored. Accordingly, when the lubricating fluid is repelled by the lubricating fluid repellent agent, it moves to the center portion of the bearing clearance and does not leak outside from the bearing. Further, a contact area of the lubricating fluid with the atmosphere is small. Therefore, the lubricating fluid seldom vaporizes into the atmosphere.

In the sixth embodiment, the bearing surface 19 of the radial bearing 15 is coated with the lubricating fluid repellent agent. Even in the case of the thrust bearing 16, at least one of the bearing surfaces of the rotary member and the stationary member may be coated with the lubricating fluid repellent agent, so that the splash and leakage of lubricating fluid R can be suppressed.

In the sixth embodiment, the bearing surface 19 of the sleeve 5 is entirely coated with the lubricating fluid repellent agent. However, the present invention is not limited to such a coating. For example, only the tapered portions 19b, 19c and both end portions of the bearing surface adjacent to the tapered portions 19b, 19c may be coated with the lubricating fluid repellent agent. In this case, it is also possible to reduce a leakage of the lubricating fluid R from the tapered portions 19b, 19c to the outside caused by the wettability. However, when the overall bearing surface 19 or the overall surface of the sleeve 5 including the bearing surface 19 is coated with the lubricating fluid repellent agent, the manufacturing process can be made easier than that of other cases, for example, the coating work to coat the lubricating fluid repellent fluid can be automated.

In the sixth embodiment, the groove 5c for generating a dynamic pressure is formed on the bearing surface body 19a of sleeve 5. However, the groove 5c for generating a dynamic pressure may be formed in a portion of the bearing surface 18 of the shaft which is opposed to the bearing surface body 19a. Alternatively, the groove 5c for generating a dynamic pressure may be formed on both surfaces 19a and 18.

In the sixth embodiment, the sleeve 5 is rotated. However, it is possible to adopt an arrangement in which the shaft 3 is rotated as a rotary member. In this case, it is preferable that the shaft 3 is coated with the lubricating fluid repellent agent.

Materials of the rotary member and the stationary member composing the bearing are not limited to metal such as carbon steel. For example, the rotary member and the stationary member may be made of synthetic resin.

The rotation drive mechanism of the sleeve 5 is substantially the same as that of the conventional example. However, the rotation drive mechanism is not limited to the above arrangement. For example, a surface opposed type motor may be adopted.

Furthermore, in the radial bearing arrangement as described the fourth embodiment show in FIG. 9, the radial bearing surface of the sleeve 50 can be coated with a lubricating fluid repellent agent corresponding to the lubricating fluid to be used. In this connection, in the case where the shaft 3 may fall away from the sleeve 50 or the housing 4a, it is not necessary to provide the seal 80. When shoulder portions are formed on both sides of the outer raceway 61 and a groove for accommodating balls is formed in one of the shoulder portions, it is possible to prevent the shaft 3 from falling away even if the seal is not provided.

Moreover, in the fourth embodiment, the sleeve 50 is fixed onto the upper inner circumferential surface of the housing 4a. Instead of fixing the sleeve 50 to the housing 4a, the following arrangement may be adopted. The inner diameter of the upper portion of the housing 4a is reduced, and a radial bearing surface having a groove for generating dynamic pressure is directly formed on the upper inner circumferential surface of the housing 4a. Further, the inner circumferential surface of the housing 4a is coated with a lubricating fluid repellent agent, so that the upper portion of the housing 4a may be used as a bearing member of the dynamic pressure bearing. In this case, the herringbone-shaped groove 5c for generating a dynamic pressure may be formed on the radial bearing surface 18 of the shaft 3.

Seventh Embodiment

Next, the seventh embodiment will be explained below. Like reference characters are used to indicate like parts in the sixth embodiment and the seventh one, and the explanations are omitted here.

Figure 13:
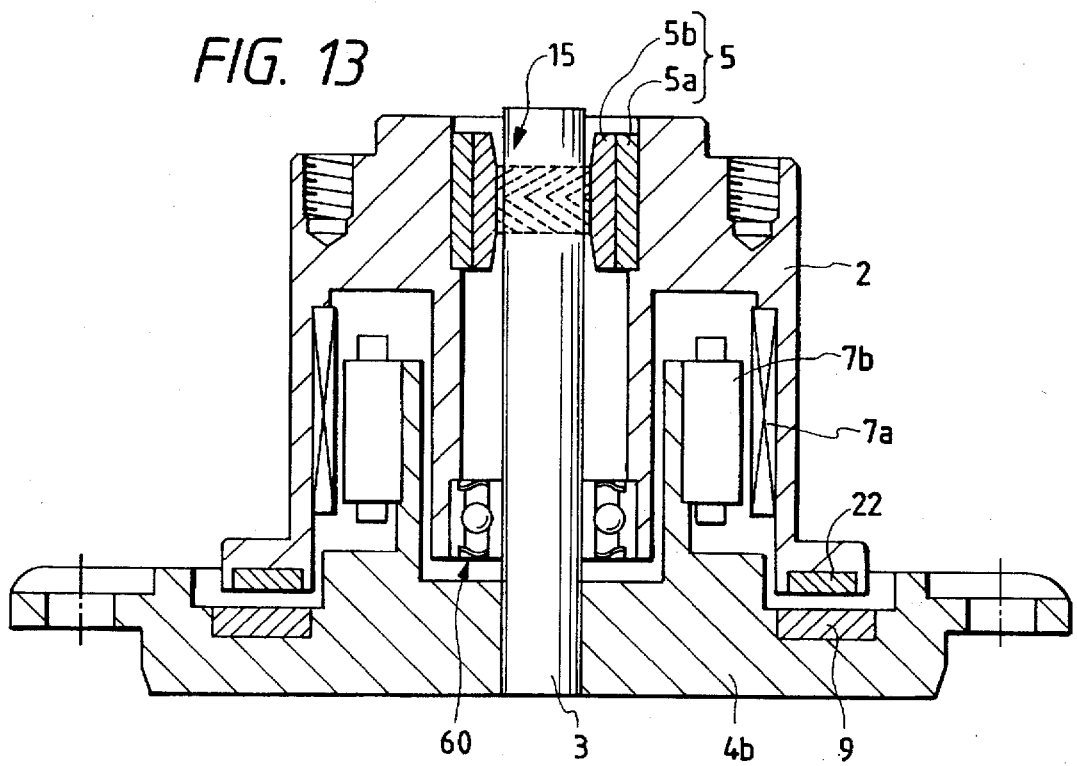
FIG. 13 is a cross-sectional view showing a spindle motor in which the dynamic pressure bearing of the seventh embodiment of the present invention is installed.

The fundamental arrangement of the eighth embodiment is substantially the same as that of the sixth embodiment. As shown in FIG. 13, a rolling bearing 60 of the deep groove ball bearing type is used as a bearing to support the lower portion of the hub 2 to which the rotor is attached.

In the same manner as that of the sixth embodiment, the sleeve 5 composing a bearing member of the upper side radial bearing 15 is composed of two layers of the inner cylinder 5b and the outer cylinder 5a, and the radial bearing surface 19 is formed on an inner circumferential surface of the inner cylinder 5b.

Other arrangements and effects are the same as those of the sixth embodiment.

In this connection, unlike the fourth embodiment, a non-contact seal is not shown in FIG. 13. However, from the viewpoint of preventing the ingress of dust into the bearing, it is preferable that a non-contact seal such as a labyrinth seal is fitted on the upper side of the radial ball bearing 15.

When the spindle motor is used in a horizontal condition, a radial load given to a bearing away from the base 4b, that is, a radial load given to a bearing on the free side of the shaft 3 is increased. Accordingly, it is preferable that a rolling bearing 60 is arranged on the side away from the base 4b, and that a dynamic pressure bearing is arranged on the fixed end side of the shaft 3 closed to the base 4b. The reason why the above arrangement is adopted is described as follows. When the dynamic pressure bearing is used on the free end side of the shaft 3, that is, on the side away from the base 4b, there is a possibility that the durability of the bearing is deteriorated at the start and stop of the apparatus. However, when the rolling bearing 60 is used on the free end side of the shaft 3, the above problems can be solved.

Even if plastic material whose wettability is low with respect to the lubricating fluid is used to make the sleeve 5, it is possible to provide the same effect as that described above. However, from the viewpoint of ensuring the mechanical strength and antiabrasion property necessary for the bearing member, material to be used is limited. Further, in the above case, it is necessary to change the material each time the type of lubricating fluid to be used is changed. Accordingly, the cost may be raised and further the quality of the bearing may fluctuate. However, according to the dynamic pressure bearing of the present invention, the above problems can be solved, that is, the conventional bearing member may be used, and the wettability may be easily lowered when the bearing member is dipped in a lubricating fluid repellent agent. Therefore, the manufacturing work can be easily carried out, and the manufacturing cost can be reduced.

Figure 14:
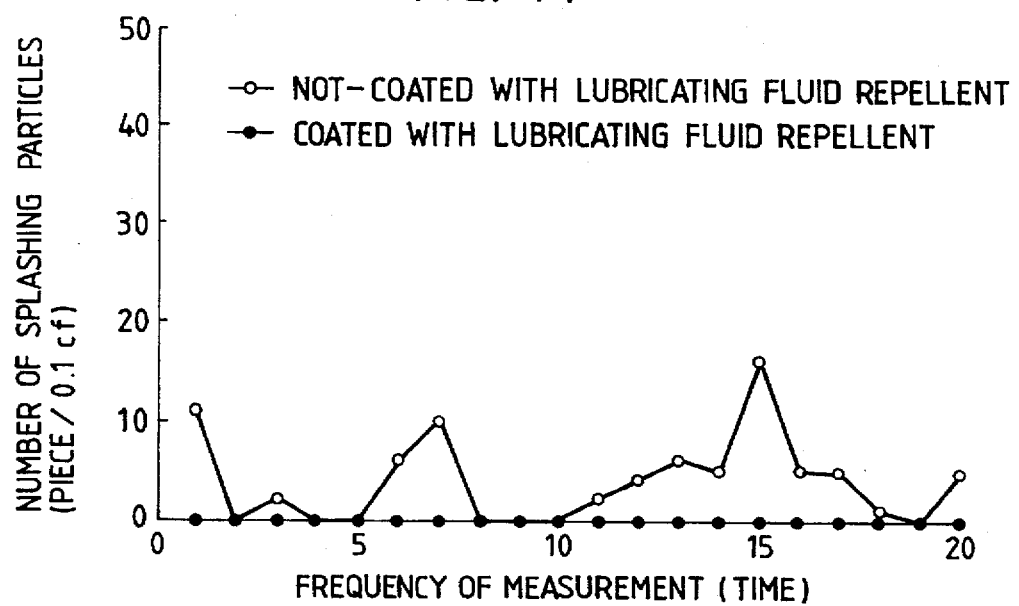
FIG. 14 is a graph showing a result of the experiment in which splash of lubricating fluid was tested.

FIG. 14 shows a result of the experiment in which the number of splashing particles of lubricating fluid R was measured when the above bearing was rotated in the following two examples. One is an example in which the lubricating fluid repellent agent was coated, and the other is an example in which the lubricating fluid repellent agent was not coated. In FIG. 14, black circles represent an example in which silicon oil was coated as a lubricating fluid repellent agent according to the present invention, and white circles represent an example in which no lubricating fluid repellent agent was coated in a comparative example. In this experiment, fluorine oil was used as the lubricating fluid R.

The measuring condition in the experiment is described as follows. A spindle motor of the above arrangement was installed and operated in a tightly closed space, From this tightly closed space, 2.7 liters of air was sucked every 6 minutes. The number of splashing particles contained in the sucked air, the particle size of which was not less than 0.3 μm, was counted by the method of gust-counting. The above measurement was conducted with respect to the above two examples, one is an example in which the lubricating fluid repellent agent was coated, and the other is an example in which no lubricating fluid repellent agent was coated. The measurement was conducted 20 times every 6 minutes in each case, that is, the measurement was conducted for 2 hours. In this connection, air is naturally fed into the tightly closed space through a filter.

As can be seen in FIG. 14, when the lubricating fluid repellent agent was not coated, the number of splashing particles was large, however, when the lubricating fluid repellent agent was coated on the overall bearing surface 19, there were no splashing particles. In this way, when the overall bearing surface 19 was coated with the lubricating fluid repellent agent, splash of particles of the lubricating fluid R was effectively prevented, so that no lubricating fluid R splashed outside the bearing.

In this connection, the lubricating fluid repellent agent may be coated only on the bearing surface 19 of the rotary member, or alternatively the lubricating fluid repellent agent may be coated only on the bearing surface 18 of the stationary member.

Eighth Embodiment

Figure 15:
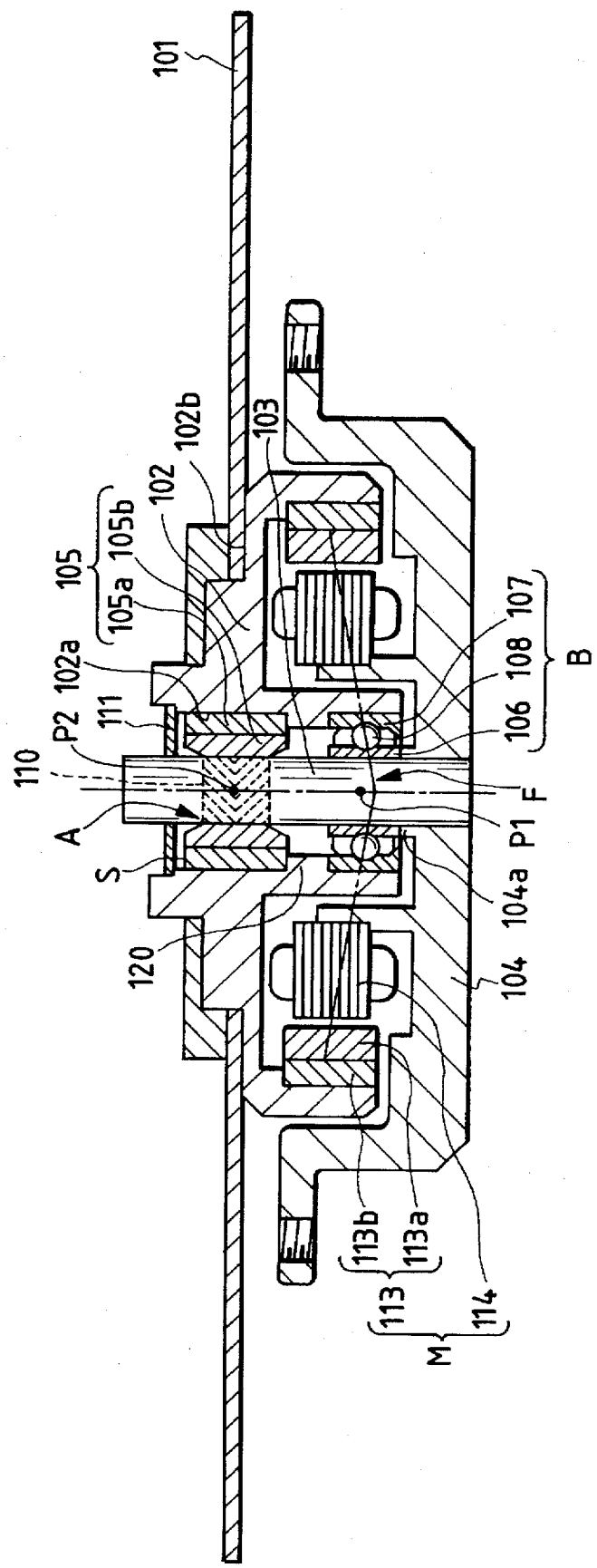
FIG. 15 is a diagram showing another example of the spindle device, which constitutes an eighth embodiment of the invention.
Figure 16A:
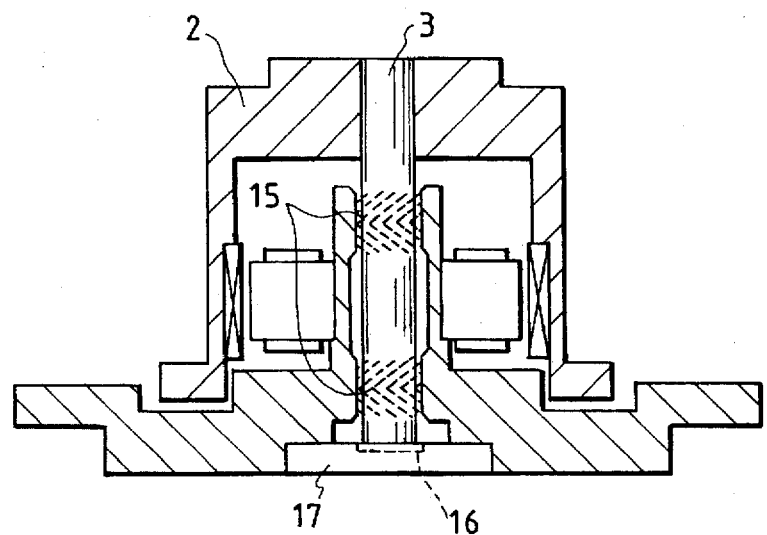
FIGS. 16A and 16B are cross-sectional views showing a spindle motor in which a dynamic pressure bearing of the first conventional example is installed.
Figure 16B:
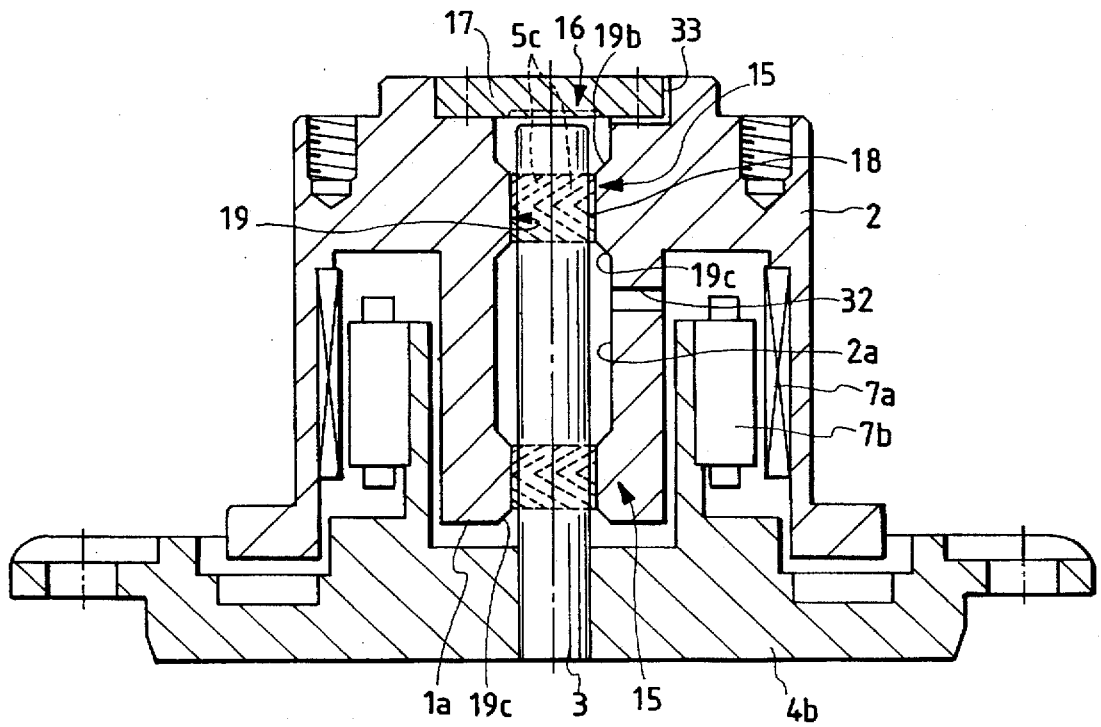
Figure 17:
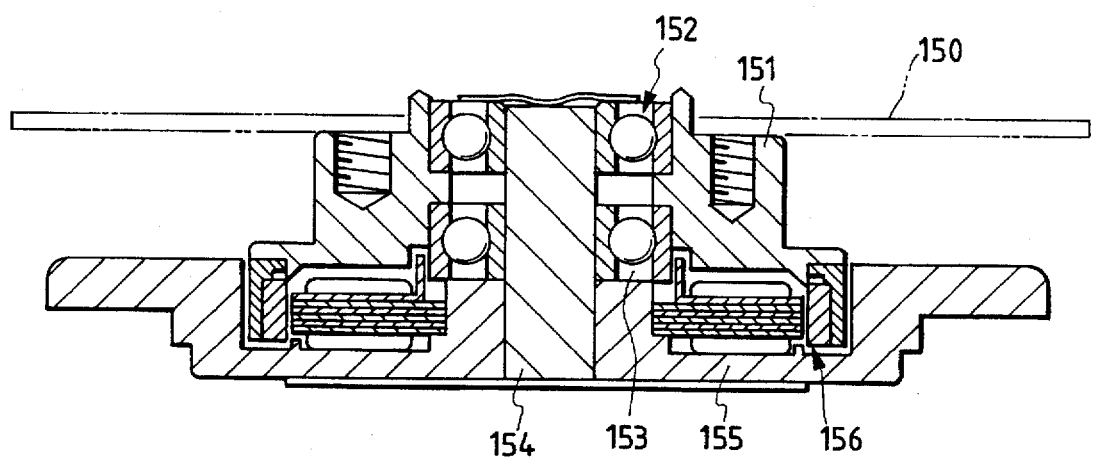
FIG. 17 is a diagram showing a second example of the conventional spindle device.

An eighth embodiment of the present invention is as shown in FIG. 15. A rotating element, namely, a hub 102 mounting a disk 101 thereon is rotatably supported by a shaft 103 through a radial dynamic pressure bearing, namely, a dynamic pressure bearing A, and a ball bearing B which is axially spaced from the dynamic pressure bearing A. The shaft 103 is fixedly secured to a housing 104, thus forming a stationary member together with the housing 104, One end portion of the shaft 103 (the lower end portion in FIG. 15) is fixedly secured to the housing 104, and the ball baring B is interposed between the lower portion of an inserting hole 102a formed in the hub 102 and the outer cylindrical surface of the shaft 103. On the other hand, a sleeve 105 is fitted in the upper portion of the inserting hole 102a. The inner cylindrical surface of the sleeve 105, and the outer cylindrical surface of the shaft 103 form the dynamic pressure bearing A. The sleeve 5 is fixedly set in the upper portion of the inserting hole 102a by press-fitting and by welding.

The sleeve 105 includes an outer cylinder 105a and an inner cylinder 105b pressed fitted in the outer cylinder 105a. That is, the outside diameter of the inner cylinder 105b is so determined that the inner cylinder 105b can be press-fitted in the outer cylinder 105a. On the other hand, dynamic pressure generating grooves 110 are formed in the inner cylindrical surface of the inner cylinder 105b.

The outer cylinder 105a is harder than the inner cylinder 105b; that is, it is made of a hard metal such as bearing steel and stainless steel. More specifically, the inside and outside diameters and both end faces of the outer cylinder 105a are finished to predetermined dimensional accuracies through cutting, heat treatment, and grinding. On the other hand, the inner cylinder 105b is made of (copper-based or iron-based) sintered metal, or a soft metal such as copper alloy and aluminum alloy. The grooves 110 are formed as follows: After the inner cylinder 105b is fixedly fitted in the outer cylinder 105a by press-fitting or shrinkage-fitting, the grooves are formed in the inner cylindrical surface of the inner cylinder 105b by ball rolling. In this operation, the inner cylindrical surface of the inner cylinder are partially raised. Those rises are removed by grinding them with the outer cylindrical surface of the outer cylinder 105a as a reference. And, if necessary, minute protrusions are removed from the inner cylindrical surface of the inner cylinder. For this purpose, the inner cylindrical surface of the inner cylinder is brushed with a brush containing abrasive grains.

The ball bearing B is assembled as follows: Its inner race 106 is fixedly mounted on the shaft 103 in such a manner that the inner race 106 is coaxial with the shaft 103, while the outer race 107 is fixedly fitted in the hub 102, with a plurality of rolling elements, namely, balls 108 interposed between the inner race 106 and the outer race 107.

The inner cylindrical surface of the inner race 106 of the ball bearing B is fixedly Joined to the shaft 103 by welding or by press-fitting the inner race on the shaft 103. In this connection, the inner cylindrical surface of the inner race may be joined to the shaft 103 by clearance fitting. In this case, the inner race 106 is axially supported while being kept in contact with an annular portion 104a of the housing 104 which is slightly protruded from the upper surface of the housing 104.

Similarly, the outer race 107 may be joined to the hub 102 by welding, press-fitting, or clearance fitting.

In the case where clearance fitting is employed, it is preferable that the gap is 10 μm or less in diameter in view of the run-out accuracy. The clearance fitting method is advantageous in that the assembling work is accomplished merely by inserting the ball bearing B so that it is achieved with ease. Especially in the case where the inner race 106 is set by clearance fitting, the assembling work of the ball bearing B is accomplished merely by mounting the previously assembled hub 102 on the shaft 103. In this case, the number of assembling steps is reduced as much as the manufacturing cost is decreased.

In the case where the outer race 107 is fitted in the hub 102 by clearance fitting, the outer race 107 is prevented from the deformation which is liable to occur when the outer race is fitted in the hub by press-fitting or welding, and the run-out of the ball bearing B can be maintained unchanged in accuracy.

The middle portion of the inserting hole 102a of the hub, as viewed in the axial direction, has a small diameter portion 120 which is smaller in diameter than the both end portions. The small diameter portion 120 is in contact with both the lower end face of the sleeve 105 and the upper end face of the outer race 107.

The dynamic pressure bearing A is designed as follower That is, one radial bearing surface (cylindrical surface) formed on the cylindrical surface of the shaft 103, and the other radial bearing surface formed on the sleeve 105 are confronted with each other with a predetermined bearing gap between them (as viewed in a direction of diameter). The bearing gap is filled with lubricating fluid.

Both ends of the other radial bearing surface formed on the sleeve, as viewed in the axial direction, have tapered surfaces. That is, the other radial bearing surface is made up of the two tapered surfaces which are formed at both ends of the sleeve, and a cylindrical bearing surface body between the two tapered surfaces.

The tapered surfaces of the sleeve are to hold the lubricating fluid by surface tension, and are each wide like a funnel at the end of the sleeve. In short, the distance between each tapered surface and the shaft, on which the sleeve is mounted, is gradually larger towards the end of the sleeve.

Preferably, the angle of inclination of each of the tapered surfaces with respect to the central axis is approximately in a range of from 2° to 40°. If the angle of inclination is smaller than 2°, then the amount of lubricating fluid held by the tapered surface is excessively small. If, on the other hand, it is larger than 40°, then the lubricating fluid is liable to splash out by the centrifugal force of the hub 102, which is the rotating element, during rotation. In the case where the speed of rotation of the hub 102 is higher than 3600 rpm, the angle of inclination of the tapered surface should be 30° or less, to prevent the lubricating fluid from splashing. The bearing device thus designed is high in durability.

In the bearing surface of the sleeve 105, dynamic-pressure generating grooves such as so-called "herringbone-shaped or spiral grooves" are formed. The grooves may be formed in one radial bearing surface of the shaft 103, or both the bearing surfaces of the sleeve 105 and the shaft 103.

Examples of the lubricating fluid filled in the above-described bearing gap are oil, grease, and magnetic fluid.

A shield plate 111 is fitted in the inserting hole 102a in such a manner that the shield plate 111 is located above the sleeve 105, and it is fixed therein by a conventional method such as caulking. The shield plate 111 is fitted in the inserting hole 102a after the lubricating fluid is injected in the bearing gap. Even if, the lubricating fluid sticks onto the cylindrical surface of the shaft 103 and the upper end face of the sleeve 105 during the injection, the lubricating fluid is held in an axial gap S between the shield plate 111 and the upper end face of the sleeve 105. Therefore, the lubricating fluid is prevented from being splashed inside the magnetic disk unit.

It is preferable that the axial gap S between the shield plate 111 and the upper end of the sleeve 105 is approximately in a range of from 5 μm to 300 μm in width as viewed in the axial direction. If it is smaller than 5 μm, then it is smaller than the bearing gap of the dynamic pressure bearing A, so that the capillary action of the lubricating fluid takes place by the surface tension. Accordingly, the lubricating fluid is sucked out of the bearing gap into the axial gap S, If, on the other hand, it is over 300 μm, the capillary action of the lubricating fluid due to its surface tension is decreased, thus making it difficult to hold the lubricating fluid there.

When the hub 102 is rotated as in the case of the eighth embodiment, a centrifugal force exerts on the lubricating fluid. Hence, it is preferable not only to fixedly secure the shield plate 111 by caulking, but also to use an adhesive agent to join the shield plate liquid-tight to the hub.

In addition, in order to more positively prevent the lubricating fluid from splashing in the magnetic disk unit, it is preferable that the hub 102 has a cover instead of the shield plate 111. However, it should be noted that the employment of the cover suffers from difficulties that, since the upper end face of the shaft 103 is covered with the cover, the upper end portion of the shaft 103 is free so that it is impossible to support both end portions of shaft 103 with stationary members.

Thus, the hub 102, on which the disk 101 is mounted, has been rotatably supported on the shaft 103 through the ball bearing B and the dynamic pressure bearing A.

An annular electric motor M is mounted between the hub 102 and the housing 104 in such a manner that the electric motor M is coaxial with the ball bearing B in the outer circumferential side of the ball bearing B in the radial direction.

The motor M is designed as follows: An annular rotor 113 is fixedly mounted on the hub 102 in such a manner that it is located near the housing 104. A stator 114 is arranged inside the rotor 113 in such a manner that the stator 114 and the rotor 113 are coaxial with each other and have a gap between them. The stator 114 is fixedly mounted on the housing 104. The rotor 113 includes: a magnet member 113a which is confronted with the outer cylindrical surface of the stator 114; and a back yoke 113b fixedly mounted on the outer cylindrical surface of the magnet member 113a. The back yoke 113b is to decrease the leakage of the magnetic flux.

Hence, the motor M, in which the rotor 113 and the stator 114 are confronted with each other in the radial direction, surrounds the ball bearing B in such a manner that the motor M is coaxial with the ball bearing B.

In the motor M, the rotor 113 is positioned slightly above the stator 114, so that the force of magnetic attraction produced between the rotor 113 and the stator 114 in the axial direction applies a pre-load to the ball bearing B. The intersection (or action point) of the contact angles of the ball bearing B is located in the opposite side to the dynamic pressure bearing A with respect to the axial center P1 of the ball bearing B, so that the whole spindle device is increased in moment rigidity. On the other hand, the action lines F which are the resultant of the forces of magnetic attraction between the rotor 113 and the stator 114 extends through the outer raceway of the ball bearing B and the centers of the balls 108, reaching the central axis of the spindle device. Hence, when the motor is started or rotated, almost all the radial component of the force of magnetic attraction produced between the rotor 113 and the stator 114 is applied to the ball bearing B, and the thrust component is applied to the ball bearing.

The forces of magnetic attraction of a plurality of permanent magnets mounted additionally, or the forces of magnetic attraction acting between permanent magnets and ferromagnetic members may be utilized for the application of the pre-load to the ball bearing B. Alternatively, the use of the above-described two forces may be employed in combination. Almost all the thrust load applied to the rotating element is supported by the ball bearing B.

In the above-described spindle device, the hub 102 and the sleeve 105 joined to the hub 102 form the rotating element.

A disk mounting surface 102b is formed on the hub 102 so that the center of gravity of the disk 101 is substantially coincident with the axial center P2 of the dynamic pressure bearing A. And, the disk 101 is mounted on the disk mounting surface 102b.

The operation, function, and effect of the spindle device thus constructed will be described.

In the spindle device, the rotating element including the hub 102 is rotatably supported on the shaft 103 by the ball bearing B and the dynamic pressure bearing A. Hence, as the motor M is driven, the rotating element is rotated around the shaft 103.

In this case, the dynamic pressure bearing A is a bearing in which one radial bearing surface and the other radial bearing surface are not in contact with each other during the rotation of the hub 102. The run-out which is due to the non-rotation synchronizing component is substantially zero. On the other hand, the ball bearing B essentially has the ball passage vibration, and the vibration which is due to the elastic deformation of the contact portions of the balls 108 and is not synchronous with the number of revolutions. Hence, the ball bearing has the run-out of the non-rotation synchronizing component which is not synchronous with the number of revolutions.

That is, the rotating element of the spindle device at a portion which is equal in axial position to the dynamic pressure bearing A is rotated with the run-out of the non-rotation synchronizing component being substantially zero. The rotating element is rotated at a portion which is equal in axial position to the ball bearing B with the run-out of the non-rotation synchronizing component being inherent with the ball bearing B.

In the eighth embodiment, the axial position of the center of gravity of the disk 101 is substantially coincident with the axial center P2 of the dynamic pressure bearing A, and therefore the radial run-out of the disk 101 is substantially equal to the run-out of the dynamic pressure bearing A. In addition, the radial run-out of the disk which is due to the non-rotation synchronizing component can be substantially zeroed. As a result, the spindle device is applicable to high-density data recording operations.

The spindle device of the eighth embodiment is free from the difficulty that it is adversely affected by the inclination of two ball bearings which is due to the assembling error. Hence, the spindle device of the invention is smaller in the run-out of non-rotation synchronizing component than the one which employs two ball bearings.

It is not always necessary that the axial position of the center of gravity of the disk 101 is coincident with the axial center P2 of the dynamic pressure bearing A. That is, if the axial position of the center of gravity of the disk 101 is located between both ends of the dynamic pressure bearing as viewed in the axial direction, and is on the central axis of the dynamic pressure bearing, then substantially the same effect is obtained.

Furthermore, as described above, when the motor M is not driven, the action lines F of the resultant of forces of magnetic attraction between the rotor 113 and the stator 114 extend through the ball bearing B, reaching the central axis of the spindle device. Hence, a larger part of the force of attraction which is produced in a radial direction by the various forces of magnetic attraction between the rotor 113 and the stator 114 is supported by the ball bearing which is large in load capacity. In the case where the dynamic pressure bearing A is designed large in load capacity, the dynamic torque is also large. However, since the radial load applied to the radial dynamic pressure bearing can be decreased as described above, the radial dynamic pressure bearing A can be designed small in load capacity.

As a result, it is possible to set the bearing torque to a small value which is a problem to be solved for the dynamic pressure bearing A. The radial component of the force of magnetic attraction which is produced between the rotor 113 and the stator 114 should be applied to the ball bearing B more than to the dynamic pressure bearing A.

It is preferable that the action lines F of the resultant of forces of magnetic attraction between the rotor 113 and the stator 114 extend through the ball bearing B, reaching the central axis of the spindle device. However, more preferably, the action lines extend through the outer raceway of the ball bearing B, reaching the central axis of the spindle device. Much more preferably, the action lines extend through the centers of the balls 108 of the ball bearing B, reaching the central axis of the spindle device.

More than one disk 101 may be mounted on the hub 102. In the case where it is required to mount more than one disk 101 on the hub 102, the resultant center of gravity of the two or more disks is so positioned that it is located between both ends of the radial dynamic pressure bearing A as viewed in the axial direction and on the central axis of the dynamic pressure bearing A. This method reduces the radial run-out of each disk which is due to the non-rotation synchronizing component to the value which is obtained when the rotating element is supported only with the dynamic pressure bearing. In this connection, it is preferable that the axial position of the center of gravity of each of the disks is located between both ends of the dynamic pressure bearing A and on the central axis of the dynamic pressure bearing A.

In the eighth embodiment, the ball bearing B, which is a rolling bearing, is of the deep groove type; however, the invention is not limited thereto or thereby. That is, an angular ball bearing, or a four-point contact ball bearing may be employed.

In the case where a four-point contact ball bearing is employed as the ball bearing B, the four-point contact ball bearing provides moment rigidity by itself; that is, the whole bearing device is improved in moment rigidity. Furthermore, in the case where the four-point contact ball bearing is employed, it is internally pre-loaded with the bearing gap as a negative gap, which dispenses with a pre-load applying mechanism such as a magnet for attracting the ball bearing.

In the eighth embodiment, the shaft 103 is stationary; however, the invention is not limited thereto or thereby. That is, the spindle device may be so modified that the shaft 103 is rotatable. In addition, in the eighth embodiment, the sleeve 105 is made up of two components of the outer cylinder 105A and the inner cylinder 105B; however, instead of two cylinders, a single cylinder may be employed as the sleeve 105.

As described above, in the dynamic pressure bearing sleeve of the bearing device of the invention, its inside and outside diameters are high in concentricity, and the dynamic pressure generating grooves can be readily formed. Hence, the bearing device of the invention is low in manufacturing cost, and high in performance, and can be assembled with high efficiency.

Furthermore, in the bearing device of the invention, first its sleeve is provided in the form of a cylinder made of an iron-based metal, and the outer layer portion of the cylinder is made harder than the inner layer portion by heat treatment. Hence, the sleeve of the invention is lower in manufacturing cost than the sleeve which is formed by combining the outer layer part and the inner layer part together which have been separately formed.

Moreover, according to the dynamic pressure bearing of the present invention, the bearing surface is coated with a lubricating fluid repellent agent, so that the wettability of the bearing surface with respect to the lubricating fluid can be reduced, and it is possible to prevent the lubricating fluid from splashing and leaking when the rotary member is rotated or not rotated.

In the spindle device of the invention, the rotating element is supported by the ball bearing and the dynamic pressure bearing, so that all the axial load of the rotating element is supported by the ball bearing. Hence, even when the spindle device is set vertically during use, the start torque is small. In addition, the bearing surface of the dynamic pressure bearing is scarcely damaged or worn, and the spindle device is high in durability even when it is frequently started and stopped.

The radial attraction force component which is produced by the various forces of magnetic attraction between the rotor and the stator at the start of the motor and during the rotation of the motor, is applied to the ball bearing large in load capacity more than to the dynamic pressure bearing; that is, the radial load applied to the dynamic bearing is decreased. Accordingly, the dynamic pressure bearing may be designed small in load capacity, and the bearing torque may be smaller than in the case where the rotating element is supported by the dynamic pressure bearing. Therefore, the spindle device can be decreased in axial height as much.

Furthermore, in the spindle device of the invention, the rotating element is supported by only one ball bearing, and the center of gravity of the disk is positioned between both ends of the dynamic pressure bearing as viewed in the axial direction. Hence, the radial run-out of the disk is substantially equal to the run-out of the dynamic pressure bearing, and the radial run-out of the disk which is due to the non-rotation synchronizing component can be substantially zeroed. Thus, the spindle device of the invention is suitably applicable to high-density data recording operations.

What is claimed is:

1. A hearing device comprising:

a housing;

a shaft arranged in an inner circumference of the housing; and a pair of bearings arranged between the shaft and the housing, and spaced from each other in an axial direction of the shaft, at least one of the bearings comprising a sleeve inserted in the housing and formed cylindrically, the sleeve comprising an outer layer portion including an outer cylindrical surface and an inner layer portion including an inner cylindrical surface, the outer layer portion being harder than the inner layer portion, the inner cylindrical surface having a groove for generating dynamic pressure.

2. The bearing device of claim 1, wherein the sleeve is a cylindrical member made of an iron-based material, and the outer layer portion is made harder than the inner layer portion by subjecting an outer cylindrical surface of the cylindrical member and at least one end face of the cylindrical member to a heat treatment.

3. The bearing device of claim 1, wherein the outer cylindrical surface of the shaft and the inner cylindrical surface are opposed to each other through a bearing clearance which is filled with a lubricating fluid, at least one of the outer cylindrical surface and the inner cylindrical surface being coated with a lubricating fluid repellent agent.

4. The bearing device of claim 1, wherein the bearings are a ball bearing and a dynamic pressure bearing, and each of the housing and the shaft comprises one of a stationary member and a rotating element supported rotatably on the stationary member by the ball bearing and the dynamic pressure bearing, the rotating element mounting a disk, the stationary member and the rotating element comprising a motor generating a force of magnetic attraction to rotate the rotating element in cooperation with each other, in which the disk has a center of gravity which is positioned between both ends of the dynamic pressure bearing in the axial direction, and the force of magnetic attraction has a radial component which is applied to the ball bearing with a load larger than to the dynamic pressure bearing.

* * * * *